United States Patent
Doshi et al.

(10) Patent No.: US 12,366,988 B2
(45) Date of Patent: Jul. 22, 2025

(54) APPARATUS, SYSTEMS, ARTICLES OF MANUFACTURE, AND METHODS FOR DATA LIFECYCLE MANAGEMENT IN AN EDGE ENVIRONMENT

(71) Applicant: Intel Corporation, Santa Clara, CA (US)

(72) Inventors: Kshitij Arun Doshi, Tempe, AZ (US); Ned M. Smith, Beaverton, OR (US); Francesc Guim Bernat, Barcelona (ES)

(*) Notice: Subject to any disclaimer, the term of this patent is extended or adjusted under 35 U.S.C. 154(b) by 974 days.

(21) Appl. No.: 17/033,185

(22) Filed: Sep. 25, 2020

(65) Prior Publication Data

US 2021/0011649 A1    Jan. 14, 2021

(51) Int. Cl.
| | |
|---|---|
| *G06F 3/06* | (2006.01) |
| *G06F 9/455* | (2018.01) |
| *H04L 41/5009* | (2022.01) |
| *H04L 47/80* | (2022.01) |

(52) U.S. Cl.
CPC .......... *G06F 3/0649* (2013.01); *G06F 3/0604* (2013.01); *G06F 3/0614* (2013.01); *G06F 3/0631* (2013.01); *G06F 3/0653* (2013.01); *G06F 3/0664* (2013.01); *G06F 3/067* (2013.01); *G06F 9/45558* (2013.01); *H04L 41/5009* (2013.01); *H04L 47/805* (2013.01); *G06F 2009/45595* (2013.01)

(58) Field of Classification Search
CPC ................. G06F 3/067; G06F 9/45558; G06F 2009/45595; G06F 3/0605; G06F 3/061; G06F 3/0685; H04L 41/5009; H04L 47/805; H04L 41/0897; H04L 41/0233; H04L 41/5019; H04L 47/28
See application file for complete search history.

(56) References Cited

U.S. PATENT DOCUMENTS

| | | | |
|---|---|---|---|
| 7,167,920 B2 | 1/2007 | Traversat et al. | |
| 7,206,934 B2 | 4/2007 | Pabla et al. | |
| 7,263,560 B2 | 8/2007 | Abdelaziz et al. | |
| 10,223,368 B2* | 3/2019 | Bhosale | G06F 16/185 |
| 10,244,071 B2 | 3/2019 | Moustafa et al. | |
| 2009/0089078 A1* | 4/2009 | Bursey | G06Q 30/0281 |
| | | | 382/293 |

(Continued)

FOREIGN PATENT DOCUMENTS

EP    1988684 A2    11/2008

*Primary Examiner* — Angelica Ruiz
(74) *Attorney, Agent, or Firm* — Hanley, Flight & Zimmerman, LLC

(57) ABSTRACT

Apparatus and methods for data lifecycle management in an edge environment are disclosed herein. An example apparatus includes an operation executor to identify a first operation to be performed for a data object at an edge node in an edge environment and a second operation to be performed for the data object, the first operation different that the second operation. The example apparatus includes a time parameter retriever to retrieve a first time value associated with the first operation from a data source and a second time value associated with the second operation from the data source. The operation executor is to execute the first operation in response to the first time value and to execute the second operation in response to the second time value.

20 Claims, 13 Drawing Sheets

(56) References Cited

U.S. PATENT DOCUMENTS

| | | | |
|---|---|---|---|
| 2017/0318047 A1* | 11/2017 | Hampel | H04W 8/005 |
| 2018/0367128 A1* | 12/2018 | Vezyrtzis | H03K 3/0372 |
| 2019/0140919 A1* | 5/2019 | Smith | H04L 67/51 |
| 2019/0174449 A1* | 6/2019 | Shan | H04W 60/04 |
| 2020/0241769 A1* | 7/2020 | Dain | G06F 3/0623 |

* cited by examiner

APPARATUS, SYSTEMS, ARTICLES OF MANUFACTURE, AND METHODS FOR DATA LIFECYCLE MANAGEMENT IN AN EDGE ENVIRONMENT

FIELD OF THE DISCLOSURE

This disclosure relates generally to edge environments, and, more particularly, to apparatus, systems, articles of manufacture, and methods for data lifecycle management in an edge environment.

BACKGROUND

A data object can be associated with a time-based logic operator that specifies a time after which a change to one or more properties of the data object is to occur. For instance, a time-to-encrypt operator can specify a duration of time after which data associated with the data object is to be encrypted. A data object associated with time-based logic operator(s) can be distributed to one or more computing nodes in an edge environment.

BRIEF DESCRIPTION OF THE DRAWINGS

The figures are not to scale. In general, the same reference numbers will be used throughout the drawing(s) and accompanying written description to refer to the same or like parts.

Figure 1:
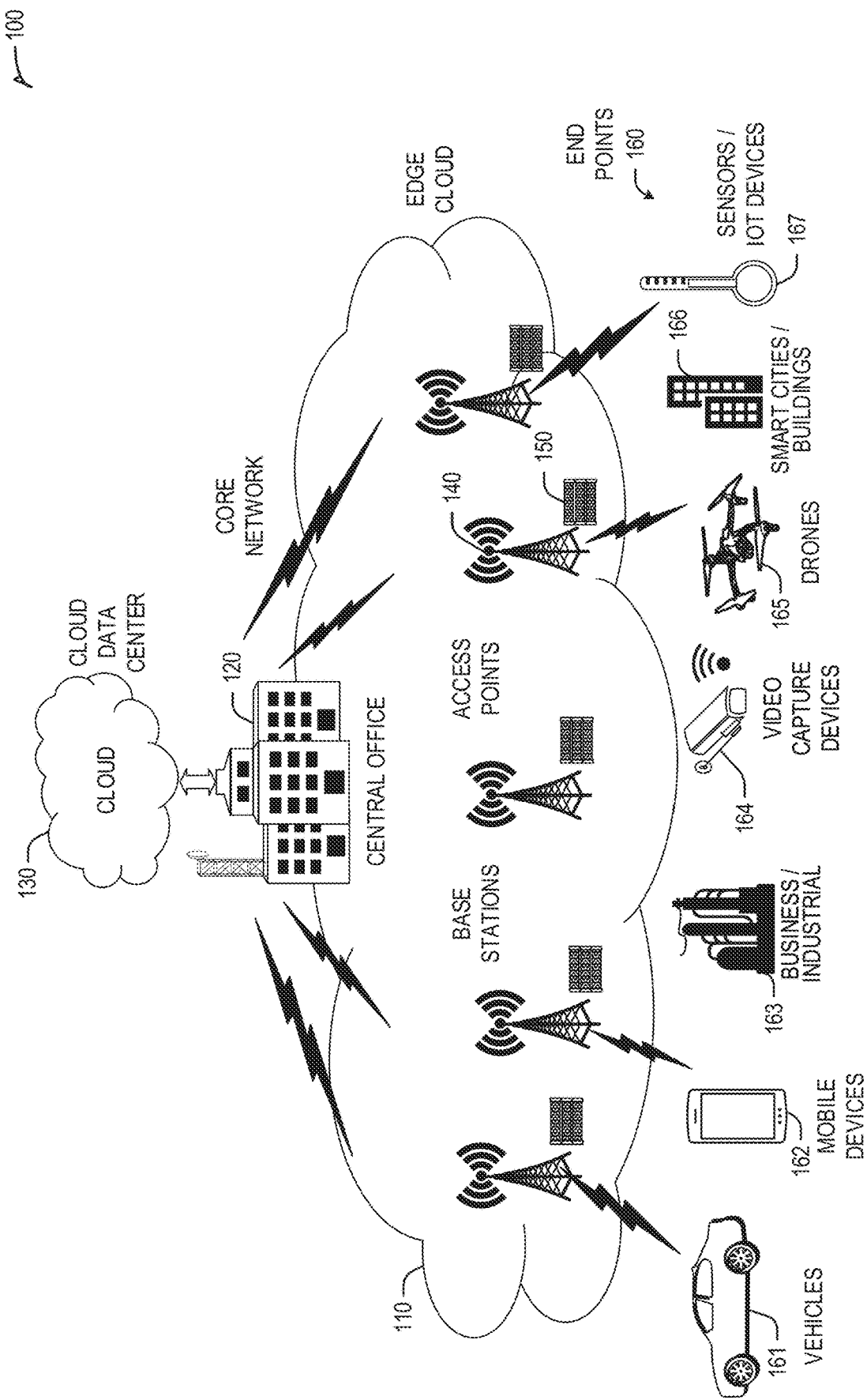
FIG. 1 illustrates an overview of an edge cloud configuration for edge computing.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Data lifecycle management operations can include time-based operations to manage state(s) or properties of data. A data object can be associated with a time-based logic operator that specifies a time after which a change to one or more properties of the data object is to occur. For instance, a time-to-encrypt operator can specify a time after which data associated with the data object is to be encrypted (e.g., after 5 microseconds). A time-to discard operator can specify a time at which data associated with the data object is to be discarded (e.g., after 10 seconds).

A data object can be distributed to one or more computing nodes in an edge environment. In some examples, an information management policy for the data object is based on imperative actions, in which each node that receive the data object executes commands that control state(s) of the data object (e.g., encryption, compression). However, in some instances, a data object is distributed to two or more computing nodes in the environment, such that multiple nodes may acquire a copy of the data object. The imperative commands may be distributed to and performed by each node with respect to copy of the data object acquired by each node. The different nodes should act in concert to maintain consistency with respect to the state of the data object such that when operations on a data object are complete, the state of the data object at each node is consistent between the nodes. However, maintaining this consistency using imperative programming can be difficult when copies of data objects are distributed to multiple nodes in an environment. For instance, one node may be permitted to perform write operations that can alter the data object. Also, the imperative command approach can increase overhead by implementing the use of messages and/or handshake protocols to provide for synchronization in managing the data object states between nodes. Further, the imperative command approach limits opportunities for distributed and decentralized management of the data object by each node.

Disclosed herein are example apparatus, systems, articles of manufacture, and methods that provide for declarative management of data objects and, in particular, for declarative management of data lifecycle states such as encryption, decryption, compression, decompression, replication, etc. In examples disclosed herein, a data object can be associated with data lifecycle management operation(s) that specify a time after which a property or state of the data object should be modified. Example data management operations can include, for instance, time-to-discard, or time after which data should be discarded, time-to-encrypt, or a time after which data should be encrypted, time-to-replicate, or a time after which a data object should be replicated, etc. In examples disclosed herein, when a node (e.g., a process, a container, a virtual machine, etc.) identifies such "time-to-X" operations (where "X" is an operation to be performed such as encryption, compression, decompression, etc.), the node retrieves a time value associated with the time-to-X operation from a central source (e.g., a central database in the edge environment). In examples disclosed herein, the time-to-X operations can be programmed as declarative statements that cause the node to perform the time value mapping or retrieval and to execute the operations. In some examples, the time parameter associated with a time-to-X operation is associated with a hard time (e.g., a deadline that is to occur as specified) or a soft time (e.g., higher priority services may occur first). In such examples, execution of the time-to-X operation may be executed in view of Quality of Service (QoS) criteria to meet service level agreement(s).

In some examples disclosed herein, the node uses an object identifier (e.g., a metadata tag) associated with the data object to retrieve the time value for a particular time-to-X operation from the central source. For instance, a node may retrieve a time value of five seconds for a time-to-encrypt operation, indicating that data should be encrypted after five seconds. Thus, in examples disclosed herein, each node that acquires a data object performs lookup operation(s) when preparing to execute the time-to-X operation(s). Further, the declarative nature of the time-to-X operations permits variation in the manner in which the operations are performed at each edge node to satisfy the purpose of the operation and the associated time parameter as compared to imperative commands.

In some examples disclosed herein, a node that is permitted to perform write operations can set or modify a value of the time parameter associated with the time-to-X operation(s). In some examples, a node with write permissions can link or chain two or more time-to-X operations for the data object and/or link time-to-X operations between two different data objects. Example chained operations that may be chained include, for instance, time-to-deduplication and time-to-replicate, such that replication of data occurs at some time after duplicative data has been removed from a data object.

In examples in which copies of data objects are distributed to different nodes, each node can proceed with respect to retrieving the time parameter(s) and executing the corresponding time-to-X operations independent of other nodes. Thus, examples disclosed herein distribute management of the data object lifecycle states to the edge nodes. Further, in examples disclosed herein, when a copy of a data object is transmitted for, for instance, a first node to a second node, the copy of the data object received at the second node is current with respect to the lifecycle operations set or written by the first node. Examples disclosed herein provide for efficient, decentralized management of data lifecycle policies across tasks and/or across machines in an edge environment.

FIG. 1 is a block diagram 100 showing an overview of a configuration for edge computing, which includes a layer of processing referred to in many of the following examples as an "edge cloud." As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
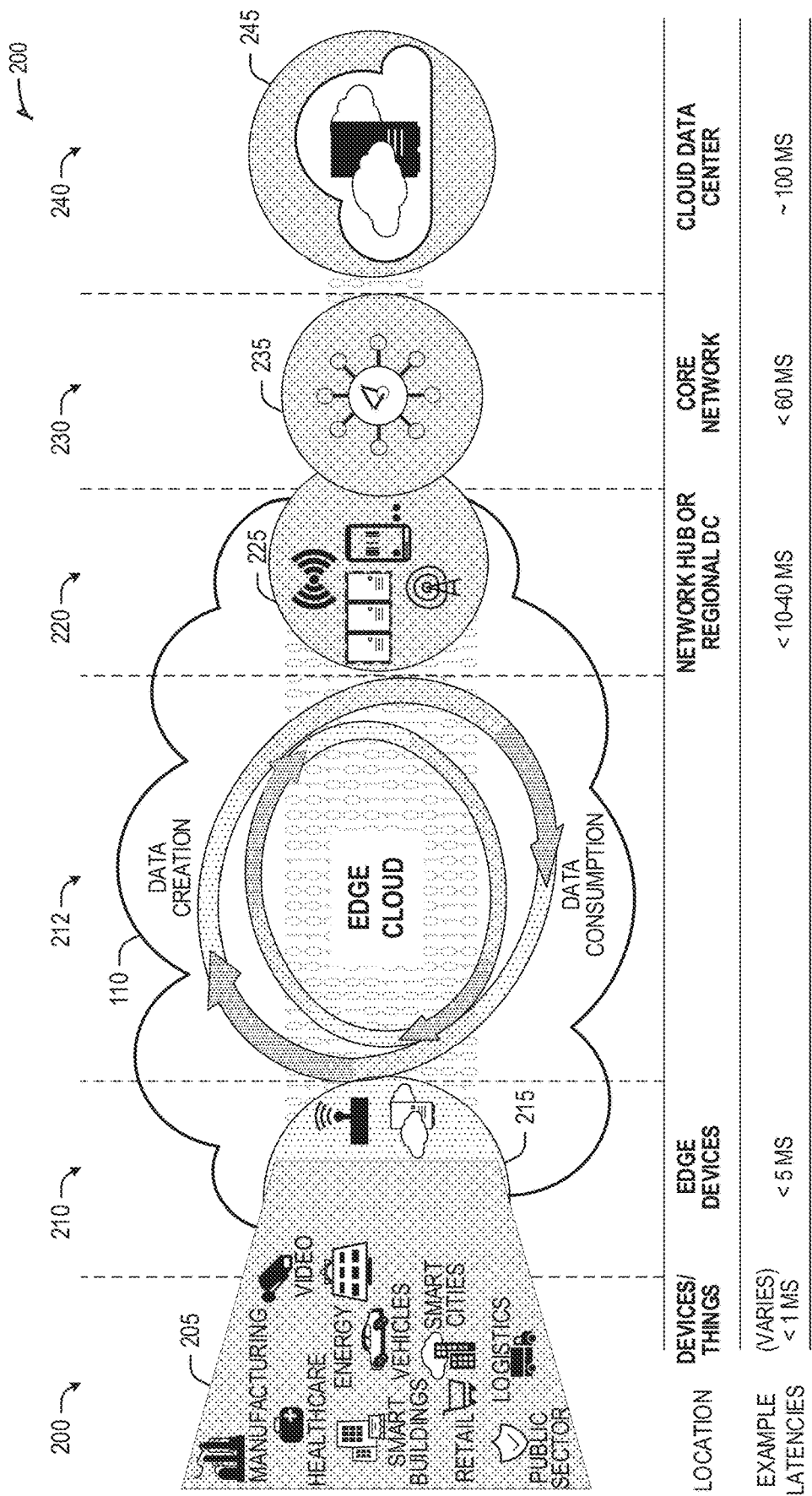
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 12B. The edge cloud 110 may also include one or more servers and/or one or more multi-tenant servers. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 3:
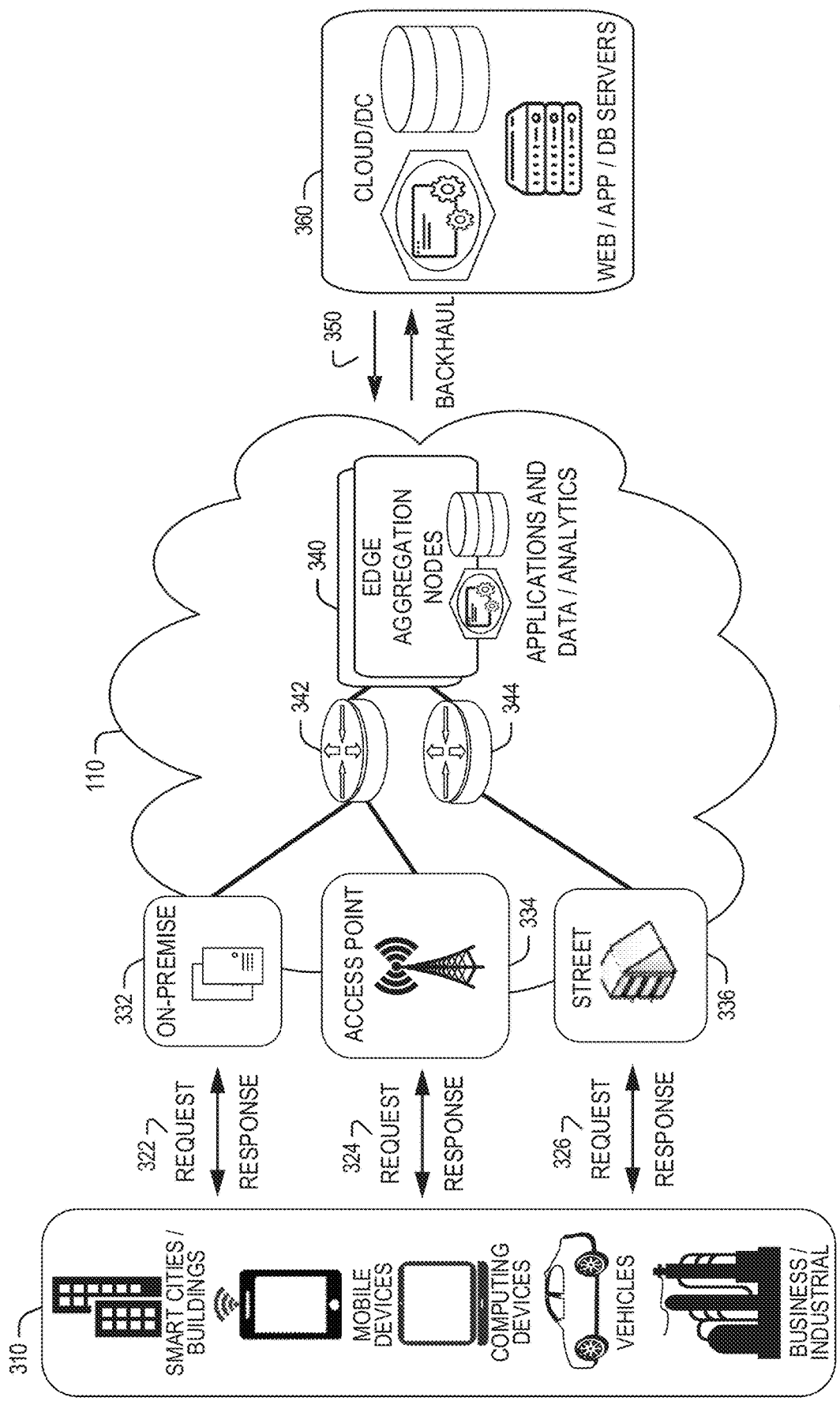
FIG. 3 illustrates a block diagram of an example environment for networking and services in an edge computing system.

FIG. 3 illustrates a block diagram of an example environment 300 in which various client endpoints 310 (in the form of mobile devices, computers, autonomous vehicles, business computing equipment, industrial processing equipment) exchange requests and responses with the example edge cloud 110. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

Figure 4:
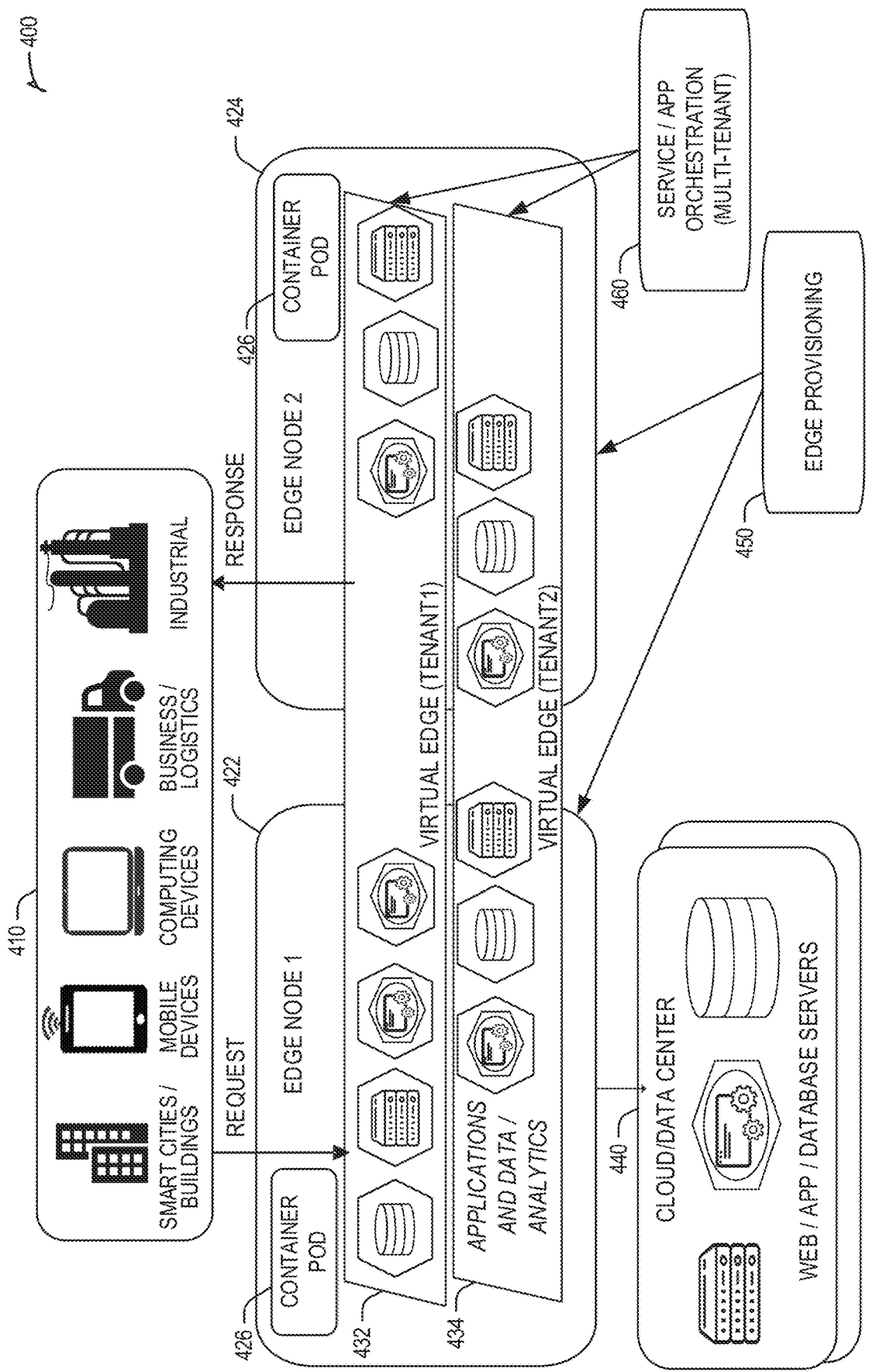
FIG. 4 illustrates deployment of a virtual edge configuration in an edge computing system operated among multiple edge nodes and multiple tenants.

FIG. 4 illustrates deployment and orchestration for virtual edge configurations across an edge computing system operated among multiple edge nodes and multiple tenants. Specifically, FIG. 4 depicts coordination of a first edge node 422 and a second edge node 424 in an edge computing system 400, to fulfill requests and responses for various client endpoints 410 (e.g., smart cities/building systems, mobile devices, computing devices, business/logistics systems, industrial systems, etc.), which access various virtual edge instances. Here, the virtual edge instances 432, 434 provide edge compute capabilities and processing in an edge cloud, with access to a cloud/data center 440 for higher-latency requests for websites, applications, database servers, etc. However, the edge cloud enables coordination of processing among multiple edge nodes for multiple tenants or entities.

In the example of FIG. 4, these virtual edge instances include: a first virtual edge 432, offered to a first tenant (Tenant 1), which offers a first combination of edge storage, computing, and services; and a second virtual edge 434, offering a second combination of edge storage, computing, and services. The virtual edge instances 432, 434 are distributed among the edge nodes 422, 424, and may include scenarios in which a request and response are fulfilled from the same or different edge nodes. The configuration of the edge nodes 422, 424 to operate in a distributed yet coordinated fashion occurs based on edge provisioning functions 450. The functionality of the edge nodes 422, 424 to provide coordinated operation for applications and services, among multiple tenants, occurs based on orchestration functions 460.

It should be understood that some of the devices 410 are multi-tenant devices where Tenant 1 may function within a tenant1 'slice' while a Tenant 2 may function within a tenant2 'slice' (and, in further examples, additional or sub-tenants may exist; and each tenant may even be specifically entitled and transactionally tied to a specific set of features all the way day to specific hardware features). A trusted multi-tenant device may further contain a tenant-specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 422, 424 may operate as security feature enforcement points for local resources allocated to multiple tenants per node. Additionally, tenant runtime and application execution (e.g., in instances 432, 434) may serve as an enforcement point for a security feature that creates a virtual edge abstraction of resources spanning potentially multiple physical hosting platforms. Finally, the orchestration functions 460 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes consisting of containers, FaaS engines, Servlets, servers, or other computation abstraction may be partitioned according to a DICE layering and fan-out structure to support a RoT context for each. Accordingly, the respective devices 410, 422, and 440 spanning RoTs may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each of the edge nodes 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 432, 434 are partitioned according to the needs of each container.

With the use of container pods, a pod controller oversees the partitioning and allocation of containers and resources. The pod controller receives instructions from an orchestrator (e.g., the orchestrator 460) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 5:
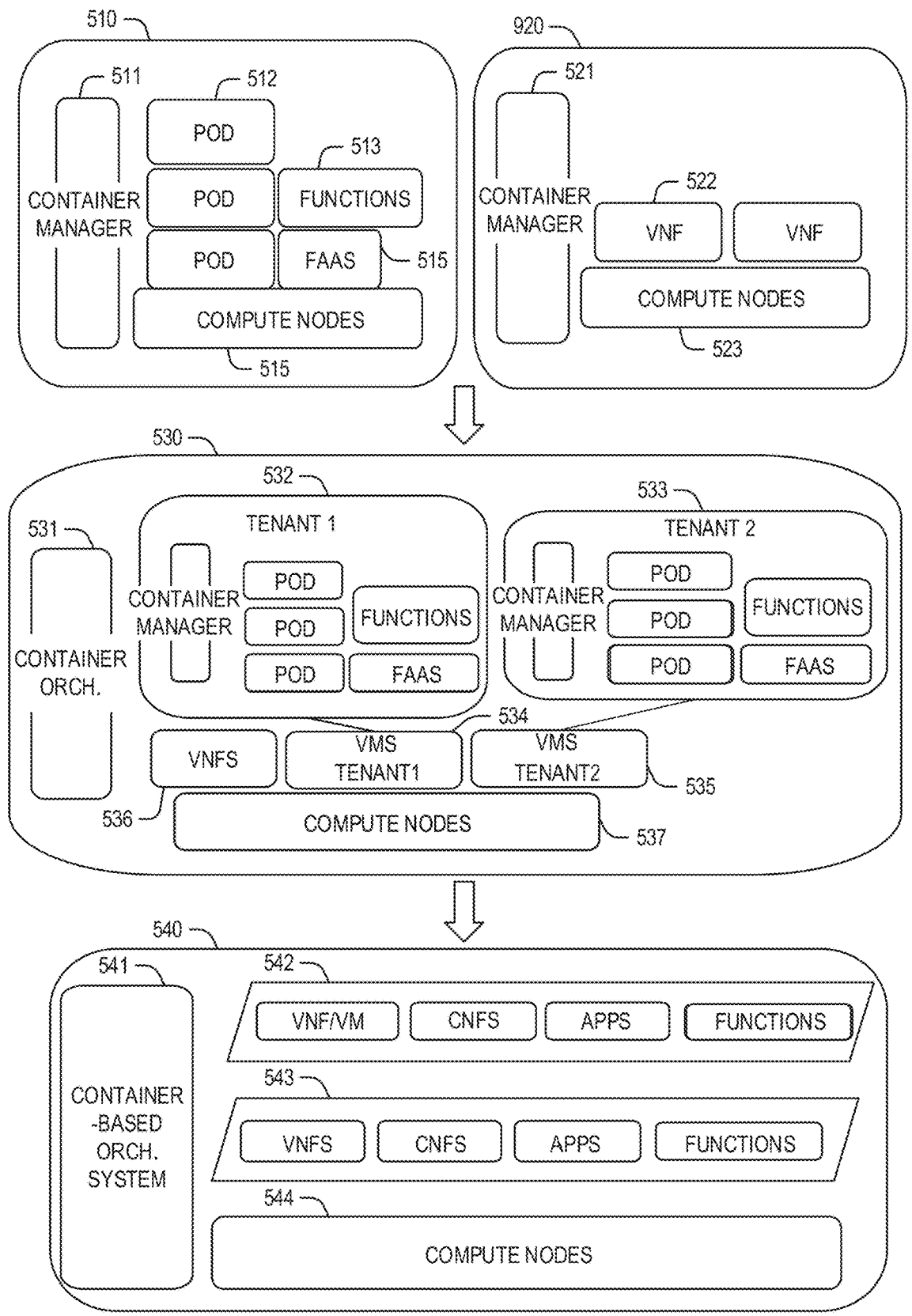
FIG. 5 illustrates various compute arrangements deploying containers in an edge computing system.

FIG. 5 illustrates additional compute arrangements deploying containers in an edge computing system. As a simplified example, system arrangements 510, 520 depict settings in which a pod controller (e.g., container managers 511, 521, and a container orchestrator 531) is adapted to launch containerized pods, functions, and functions-as-a-service instances through execution via compute nodes (515 in arrangement 510), or to separately execute containerized virtualized network functions through execution via compute nodes (523 in arrangement 520). This arrangement is adapted for use of multiple tenants in an example system arrangement 530 (using compute nodes 536), where containerized pods (e.g., pods 512), functions (e.g., functions 513, VNFs 522, 536), and functions-as-a-service instances (e.g., FaaS instance 514) are launched within virtual machines (e.g., VMs 534, 535 for tenants 532, 533) specific to respective tenants (aside the execution of virtualized network functions). This arrangement is further adapted for use in system arrangement 540, which provides containers 542, 543, or execution of the various functions, applications, and functions on compute nodes 544, as coordinated by an container-based orchestration system 541.

The system arrangements of depicted in FIG. 5 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 6:
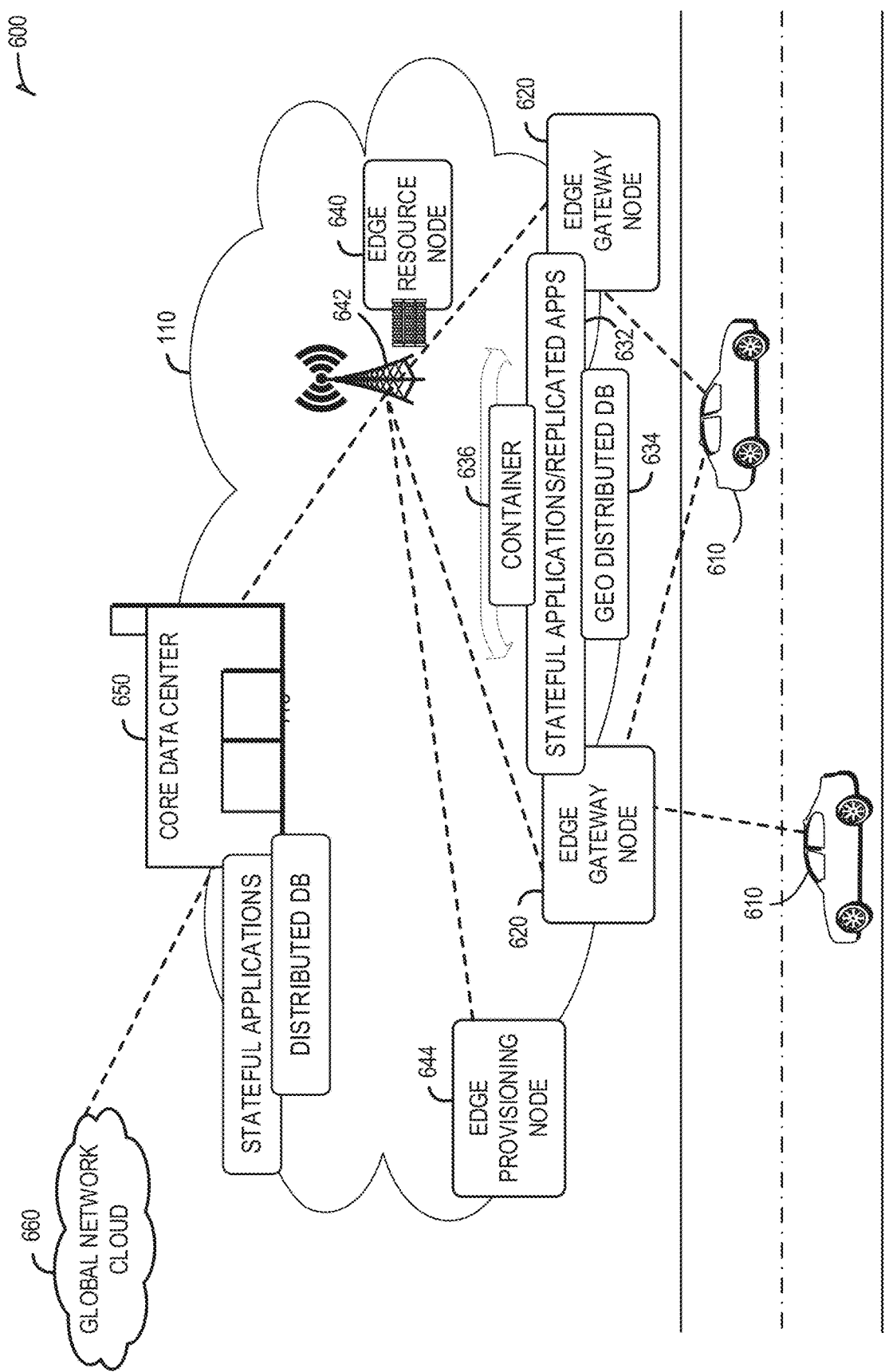
FIG. 6 illustrates an example compute and communication use case involving mobile access to applications in an example edge computing system.

It should be appreciated that the edge computing systems and arrangements discussed herein may be applicable in various solutions, services, and/or use cases involving mobility. As an example, FIG. 6 shows an example simplified vehicle compute and communication use case involving mobile access to applications in an example edge computing system 600 that implements an edge cloud such as the edge cloud 110 of FIG. .1. In this use case, respective client compute nodes 610 may be embodied as in-vehicle compute systems (e.g., in-vehicle navigation and/or infotainment systems) located in corresponding vehicles which communicate with example edge gateway nodes 620 during traversal of a roadway. For instance, the edge gateway nodes 620 may be located in a roadside cabinet or other enclosure built—into a structure having other, separate, mechanical utility, which may be placed along the roadway, at intersections of the roadway, or other locations near the roadway. As respective vehicles traverse along the roadway, the connection between its client compute node 610 and a particular one of the edge gateway nodes 620 may propagate so as to maintain a consistent connection and context for the example client compute node 610. Likewise, mobile edge nodes may aggregate at the high priority services or according to the throughput or latency resolution requirements for the underlying service(s) (e.g., in the case of drones). The respective edge gateway devices 620 include an amount of processing and storage capabilities and, as such, some processing and/or storage of data for the client compute nodes 610 may be performed on one or more of the edge gateway nodes 620.

The edge gateway nodes 620 may communicate with one or more edge resource nodes 640, which are illustratively embodied as compute servers, appliances or components located at or in a communication base station 642 (e.g., a based station of a cellular network). As discussed above, the respective edge resource node(s) 640 include an amount of processing and storage capabilities and, as such, some processing and/or storage of data for the client compute nodes 610 may be performed on the edge resource node(s) 640. For example, the processing of data that is less urgent or important may be performed by the edge resource node(s) 640, while the processing of data that is of a higher urgency or importance may be performed by the edge gateway devices 620 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 640 also communicate with the core data center 650, which may include compute servers, appliances, and/or other components located in a central location (e.g., a central office of a cellular communication network). The example core data center 650 may provide a gateway to the global network cloud 660 (e.g., the Internet) for the edge cloud 110 operations formed by the edge resource node(s) 640 and the edge gateway devices 620. Additionally, in some examples, the core data center 650 may include an amount of processing and storage capabilities and, as such, some processing and/or storage of data for the client compute devices may be performed on the core data center 650 (e.g., processing of low urgency or importance, or high complexity).

The edge gateway nodes 620 or the edge resource node(s) 640 may offer the use of stateful applications 632 and a geographic distributed database 634. Although the applications 632 and database 634 are illustrated as being horizontally distributed at a layer of the edge cloud 110, it will be understood that resources, services, or other components of the application may be vertically distributed throughout the edge cloud (including, part of the application executed at the client compute node 610, other parts at the edge gateway nodes 620 or the edge resource node(s) 640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 636 (or pod of containers) may be flexibly migrated from one of the edge nodes 620 to other edge nodes (e.g., another one of edge nodes 620, one of the edge resource node(s) 640, etc.) such that the container with an application and workload does not need to be reconstituted, re-compiled, re-interpreted in order for migration to work. However, in such settings, there may be some remedial or "swizzling" translation operations applied. For example, the physical hardware at the edge resource node(s) 640 may differ from the hardware at the edge gateway nodes 620 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 6 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 620, some others at the edge resource node(s) 640, and others in the core data center 650 or global network cloud 660.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 600 can include or be in communication with an edge provisioning node 644. The edge provisioning node 644 can distribute software such as the example computer readable instructions 1282 of FIG. 12B, to various receiving parties for implementing any of the methods described herein. The example edge provisioning node 644 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 644. For example, the entity that owns and/or operates the edge provisioning node 644 may be a developer, a seller, and/or a licensor (or a customer and/or consumer thereof) of software instructions such as the example computer readable instructions 1282 of FIG. 12B. The receiving parties may be consumers, service providers, users, retailers, OEMs, etc., who purchase and/or license the software instructions for use and/or re-sale and/or sub-licensing.

In an example, edge provisioning node 644 includes one or more servers and one or more storage devices. The storage devices host computer readable instructions such as the example computer readable instructions 1282 of FIG. 12B, as described below. Similarly to edge gateway devices 620 described above, the one or more servers of the edge provisioning node 644 are in communication with a base station 642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third party payment entity. The servers enable purchasers and/or licensors to download the computer readable instructions 1282 from the edge provisioning node 644. For example, the software instructions, which may correspond to the example computer readable instructions 1282 of FIG. 12B, may be downloaded to the example processor platform/s, which is to execute the computer readable instructions 1282 to implement the methods described herein.

In some examples, the processor platform(s) that execute the computer readable instructions 1282 can be physically located in different geographic locations, legal jurisdictions, etc. In some examples, one or more servers of the edge provisioning node 644 periodically offer, transmit, and/or force updates to the software instructions (e.g., the example computer readable instructions 1282 of FIG. 12B) to ensure improvements, patches, updates, etc. are distributed and applied to the software instructions implemented at the end user devices. In some examples, different components of the computer readable instructions 1282 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

In further examples, any of the compute nodes or devices discussed with reference to the present edge computing systems and environment may be fulfilled based on the components depicted in FIGS. 12A and 12B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 7:
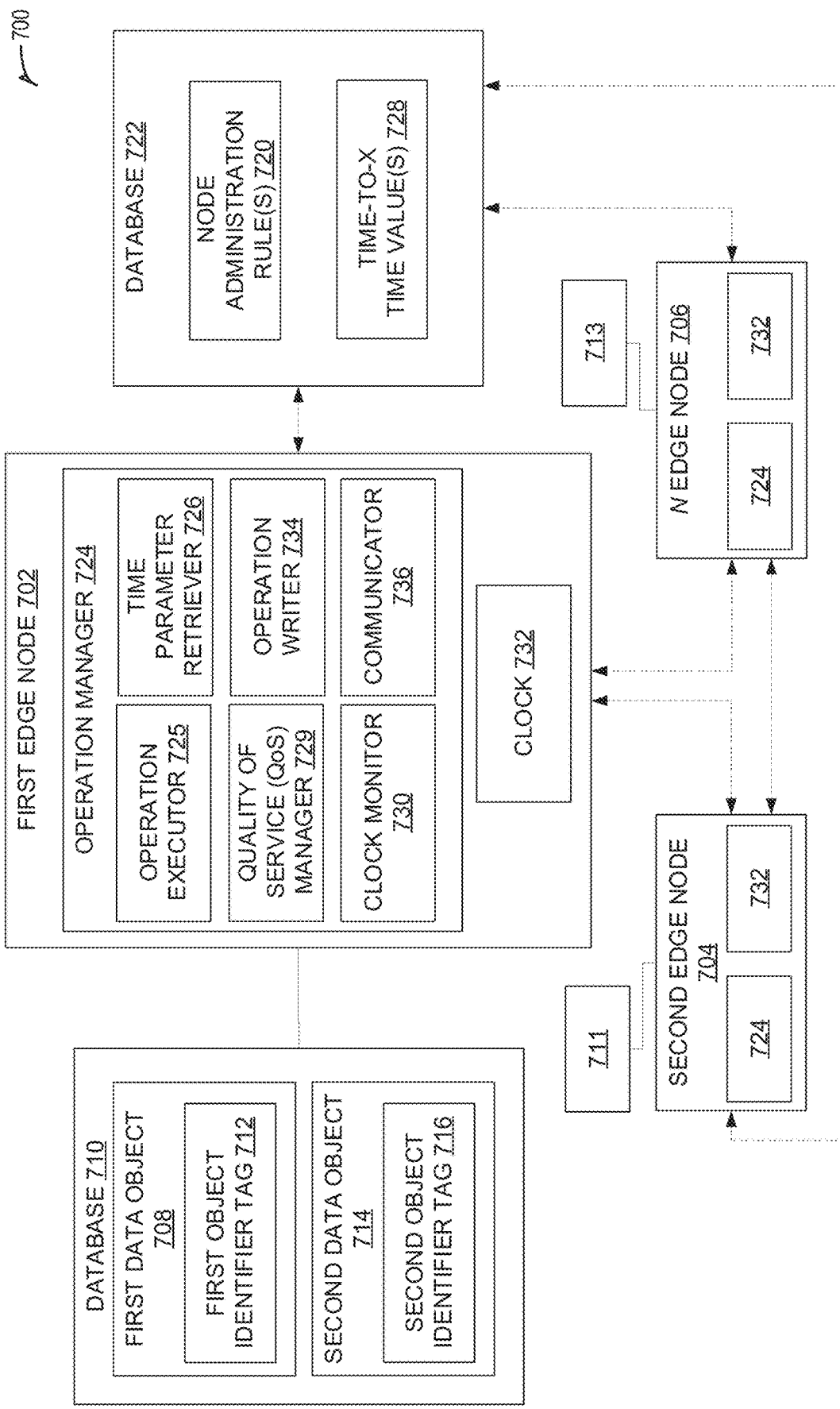
FIG. 7 illustrates an example edge computing system including one or more edge nodes, the respective edge nodes including an operation manager to manage lifecycle data operations for one or more data object(s) in accordance with teachings of this disclosure.

FIG. 7 illustrates an example edge computing system 700 including a plurality of edge computing nodes to manage lifecycle data operations for one or more data object(s) in accordance with teachings of this disclosure. The edge node(s) of the example system 700 can include, but are not limited to, for instance, a process, a container, a virtual machine, etc. As shown in FIG. 7, the example system 700 includes a first edge node 702 and a second edge node 704. The example system can include n additional node(s) 706. The example system 700 of FIG. 7 can correspond to the example edge computing network 400 disclosed in connection with FIG. 4 including the edge nodes 422, 424. In examples disclosed herein, the edge computing system 700 provides for implementation of cloud or cloud-like functionality that is located closer to a consuming device in network than, for instance, a cloud data center, as disclosed in connection with FIG. 1. In some examples, the edge computing system 700 of FIG. 7 provides for hybrid computing in which, for instance, data may be processed at the edge nodes 702, 704, 706 and at least some storage and/or analysis occurs at the cloud.

In the example system 700, the first edge node 702 acquires, creates, receives, or otherwise assumes ownership of a first data object 708. In some examples, the first data object 708 can be received from, for example, another node in the example system 700, such as the second edge node 704. In some examples, the first data object 708 can be created by the first edge node 702 by, for example, transforming information that the first edge node 702 receives from endpoint devices such as the endpoint devices 161-167 of FIG. 1 into new data objects, or, by making a copy of another object that the first edge node 702 receives from, for instance, a third edge node 706. In other examples, the first edge node 702 accesses the first data object 708 from, for instance, the cloud/data center 130, 440 of FIGS. 1 and 4. The first data object 708 can include, for example, a software application to be managed by the first edge node 702. Put another way, the first edge node 702 obtains ownership of the first data object 708. The first data object 708 includes a first object identifier tag 712, or a unique identifier assigned to the first data object 708 (e.g., metadata including an alphanumeric identifier). The first object identifier tag 712 can be logically associated with the first data object 708 through the use of a mapping data structure or a directory or a mapping function (not shown). Thus, the first object identifier tag 712 does need to be physically inside or adjacent to the first data object 708.

The first data object 708 can be stored in a database 710 accessible to the first edge node 702. Similarly, a database 711 for storing data object(s) is accessible to the second edge node 704 and database(s) 713 for storing data object(s) is accessible to the other node(s)706. The example database(s) 710, 711, 713 of FIG. 7 are implemented by any memory, storage device and/or storage disc for storing data such as, for example, flash memory, magnetic media, optical media, etc. Furthermore, the data stored in the example database(s) 710, 711, 713 may be in any data format such as, for example, binary data, comma delimited data, tab delimited data, structured query language (SQL) structures, image data, etc. While the illustrated example database(s) 710, 711, 713 are illustrated as a single element, the database(s) 710, 711, 13 and/or any other data storage elements described herein may be implemented by any number and/or type(s) of memories.

In some examples, the first edge node 702 assumes ownership of a second data object 714 different than the first data object 708. The second data object 714 can be received from, for instance, another edge node 704, 706 and/or a cloud/data center. The second data object 714 can be stored in the database 710. The second data object 714 includes a second object identifier tag 716 that is unique to the second data object 714. In some examples, the first edge node 702 has ownership of the first and second data object 708, 714 concurrently. In other examples, the first edge node 702 sends, for instance, the first data object 708 to another node before accessing the second data object 714 or after accessing the second data object 714 such that the first edge node 702 may only have ownership of the second data object 714 for some time.

In the example of FIG. 7, the second edge node 704 and/or the other edge node(s) 706 of the system 700 can receive copies of the first data object 708 and/or the second data object 714 and stored in database(s) accessible by the edge node(s) 704, 706. Additionally, any of the first edge node 702, the second edge node 704, and/or the other edge node(s) 706 can receive or assume ownership of other data objects in addition to or in alternative to the first data object 708 and/or the second data object 714.

In the system 700 of FIG. 7, the edge nodes(s) 702, 704, 706 execute tasks or applications that read or write or change properties such as access rights over the data object(s) 708, 714 in response to instructions and/or requests received from the edge environment (e.g., from client edge devices and/or the edge cloud as disclosed in connection with FIGS. 1-6 above). Each of the edge nodes 702, 704, 706 includes an operation manager 724 to manage operations performed by the respective nodes over the data object(s) received at each node. For illustrative purposes, the operation manager 724 is discussed in connection with the first edge node 702 with the understanding that the examples disclosed herein can apply to any of the other nodes 704, 706.

The example operation manager 724 executes operations for the data object(s) 708, 714 acquired by the first edge node 702 and stored in the database 710, such as read operation(s) encoded in metadata associated with the data object and/or write operation(s) to modify data associated with the data object. In the example of FIG. 7, the operation manager 724 of first edge node 702 manages the first data object 708 and/or the second data object 714 in accordance with node administration rule(s) or protocol(s) 720.

The node administration rule(s) 720 can be user-defined rule(s) that define ownership rights and access policies of each node with respect to a data object. For instance, the node administration rule(s) 720 can define the read/write abilities of each of the edge nodes 702, 704, 706 with respect to managing the data object(s) 708, 714. For example, the node administration rule(s) 720 can permit the operation manager 724 of the first edge node 702 to perform write operation(s) for the first data object 708 (e.g., modify the first data object 708). In some examples, the node administration rule(s) 720 may only permit the operation manager 724 of the first edge node 702 to perform write operation(s) for a local copy of the first data object 708 generated by the first edge node 702. The node administration rule(s) 720 provide for consistency with respect to management of the data objects 708, 714 in the edge environment by the respective nodes 702, 704, 706.

The node administration rule(s) 720 are stored in a database 722. The example database 722 of the illustrated example of FIG. 7 is implemented by any memory, storage device and/or storage disc for storing data such as, for example, flash memory, magnetic media, optical media, etc. Furthermore, the data stored in the example database 722 may be in any data format such as, for example, binary data, comma delimited data, tab delimited data, structured query language (SQL) structures, image data, etc. While the illustrated example database 722 is illustrated as a single element, the database 722 and/or any other data storage elements described herein may be implemented by any number and/or type(s) of memories In the example of FIG. 7, the database 722 is accessible to the first edge node 702, the second edge node 704, and the other edge nodes 706 of the system 700. In some examples, the database 722 is located at a cloud data center (e.g., the cloud data center 130, 440 of FIGS. 1 and 4). In other examples, the database 722 is associated with one of the nodes (e.g., the database 710) and is accessible by the other nodes.

The example operation manager 724 of FIG. 7 includes an operation executor 725 to provide means for executing operations (e.g., read operations) associated with the data object(s) 708, 714 received at the first edge node 702. In some examples, the operations to be performed by the operation executor 725 with respect to the data object(s) 708, 714 include operations that are to occur after a particular time. For example, the operation executor 725 can execute an operation specifying that data associated with the first data object 708 is to be encrypted after a certain amount of time has passed (e.g., perform encryption after 5 microseconds). Put another way, the operation executor 725 executes a "time-to-encrypt" operation for the first data object 710. Other example time-based operations can include time-to-send-after-time-to-encrypt, time-to-archive, time-to-discard, and time-to-copy-to-shared-memory. In examples disclosed herein, such time-based-operations are generally referred to as "time-to-X," where "X" includes an operation to be performed after a specified time (e.g., send data, compress data).

Table 1, below, lists example time-to-X operations that can be executed by the operation executor of the operation manager 724 of the first edge node 702 (or the operation manager 724 of the second edge node 704 or other edge node(s) 706). The time-to-X operations that may be performed can include additional operations not listed in Table 1.

TABLE 1

Sample Data Lifecyle Management "Time-to-X" Operations

Time-to-X Operation

| | |
|---|---|
| c.1 | Time-to-Dedup |
| c.2 | Time-to-Compress-and-Live |
| c.3 | Time-to-Encrypt |
| c.4 | Time-to-Store-after-time-to-Encrypt |
| c.5 | Time-to-Encrypt-after-Time-to-Compress |
| c.6 | Time-to-Decrypt |
| c.7 | Time-to-Decompress-after-Time-to-Decrypt |
| c.8 | Time-to-Discard |
| c.9 | Time-to-Replicate |
| c.10 | Time-to-Send |
| c.11 | Time-to-Send-after-Time-to-Encrypt |
| c.12 | Time-to-Archive |
| c.13 | Time-to-Mark-Read-Only |
| c.14 | Time-to-Release |
| c.15 | Time-to-Revalidate |
| c.16 | Time-to-evict-to-next-tier |
| c.17 | Time-to-Copy-to-Shared-Memory |
| c.18 | Time-to-Serialize |
| c.19 | Time-to-No-Op |

In examples disclosed herein, the time-to-X operation(s) are defined as declarative primitive(s) such that the operation manager 724 of the respective edge nodes 702, 704, 706 performs a retrieval or lookup operation to determine a time value associated with a particular time-to-X operation. In the example of FIG. 7, the operation manager 724 includes a time parameter retriever 726 that provides means for retrieving a time value associated with a respective time-to-X operation using the object identifier tag of the data object for which the operation is to be executed. In examples disclosed herein, time value(s) 728 associated with the time-to-X operation(s) for each data object can be stored in database accessible to each of the edge nodes 702, 704, 706, such as the database 722 of FIG. 7. The database 722 may be replicated and/or various parts of the database 722 may be cached across different edge nodes, compute nodes, containers, etc. in the system 700 to provide high performance and high speed access by the respective operation managers 724 at the various edge nodes, compute nodes, containers, etc. The time value(s) 728 (e.g., metadata value(s)) can be defined by user input(s) and/or set by the operation executor 725 of operation manager 724 of the respective nodes 702, 704, 706, as disclosed herein. The time value(s) 728 can be stored for corresponding time-to-X operation(s) and associated data object identifier(s).

For example, when a time-to-X operation is to be executed by the operation executor 725 of the first edge node 702 for the first data object 708, the time parameter retriever 726 executes a mapping operation to retrieve a time value associated with the particular time-to-X operation from the database 722 using the first object identifier tag 712 associated with the first data object 708. For instance, for a given data lifecycle management operation X, the time parameter retriever 726 executes the following retrieval or mapping operation to obtain a time value T for the operation:

$$TTX \ (Obj\text{-}ID): Obj\text{-}ID \xrightarrow{X} T,$$

where T is either a relative time from current time or an absolute time, Obj-ID is the object identifier tag for the data object (e.g., the tag 712 for the first data object 708), and X is the particular time-to-X operation.

Thus, in the example of FIG. 7, the time parameter retriever 726 performs a retrieval, lookup, or "get" operation to retrieve the time value T for a particular time-to-X operation. Rather than being directed to perform the time-to-X operation in response to an imperative command, the time-to-X metadata (e.g., the time value T) is retrieved by the time parameter retriever 726 of the first edge node 702 in a distributed, declarative manner. Further, in view of the declarative nature of the time-to-X operation, the operation executor 725 can determine a manner in which execution of the time-to-X operation (e.g., encryption) that satisfies the time parameter requirement is achieved (as compared to an imperative command). In examples disclosed herein, the time-to-X operations provide for distribution of data management responsibilities across tasks and/or across machines.

In some examples, the time parameter retriever 726 retrieves the time value T by reading a metadata value associated with the first data object 708 and stored in the database 710. Such examples may be used when the example system 700 including the first data object 708 implements attribute storage.

In examples disclosed herein, each of the time-to-X operations (e.g., the time-to-X operations of Table 1) is associated with a set of resources (e.g., e-compute, memory, acceleration etc.) To meet criteria of service level agreement(s) (SLA(s)), the example operation manager 724 of FIG. 7 includes a quality of service (QoS) manager 729. The QoS manager 729 provides means for managing resources with respect to implementation of the time-to-X operations to satisfy term(s) of the SLA(s). For instance, the QoS manager 729 monitors and/or controls distribution of resources such as memory bandwidth allocation, CPU, etc. to implement the time-to-X operations in accordance with the SLA(s). As an example, a time value T for a time-to-X operation may be a set or hard time value such that the time-to-X operation should occur within the specified time value. In such examples, the QoS manager 729 manages allocation of resources to satisfy the time criteria to execute the time-to-X operation. Conversely, if the time value T for a time-to-X operation is a soft time value, the QoS manager 729 allocates resources to satisfy the time criteria to execute the time-to-X operation, but may determine that other services in the edge network including the system 700 have higher priority and, thus, controls allocation of the resources in accordance with the SLA.

The example operation manager 724 of FIG. 7 includes a clock monitor 730 to monitor a clock 732 of the first edge node 702 (e.g., a clock of a machine or other hardware that implements the first edge node 702). In some examples, the clock 732 is time-synchronized with a global clock via, for instance, an IEEE 1588 precision time protocol (PTP)). In other examples, the clock 732 is time-synchronized using reference clock data at a local or regional level within the system 700.

The example clock monitor 730 of FIG. 7 monitors the time synchronization between the global, local, or regional clocks and the clock 732 of the first edge node 702. In some examples, the clock monitor 730 implements time synchronization protocol(s) (e.g., Network Time Protocols) to synchronize the clock 732 with the reference system clock(s) (e.g., reference clock data). In some examples, the time parameter mapping or retrieval operation executed by the time parameter retriever 726 to obtain the time value T for a time-to-X operation implements a transparent cache, an acceleration mechanism, a shadow-table lookup, and/or other means for increasing a speed at which the retrieval operation is performed to facilitate synchronization of the clock 732 with the synchronization protocol.

In other examples, the hardware performing the retrieval operation is not explicitly time-synchronized with a global clock or other system clock but, instead, follows an ad-hoc mechanism that provides for sufficient time synchronization. For example, a GitHub™ file may have a timestamp that is not explicitly synchronized with the clock 732 of the first edge node 702, however, the synchronization between the file timestamp and the clock 732 of the first edge node 702 may be adequate for implementing the time-to-X operation based on the retrieved time value.

As disclosed above, in some examples, the first edge node 702 can perform write operations with respect to the data object(s) 708, 714 based on the node administration rule(s) 720. The example operation manager 724 of FIG. 7 includes an operation writer 734 that provides means for modifying the data associated with the data object(s) 708, 714.

For example, in addition or in alternative to retrieving the time value(s) 728 and executing the time-to-X operations, the first edge node 702 may be assigned write permissions to modify the time value(s) for the time-to-X operation(s). Accordingly, if a time-to-X operation is specified for a data object 708, 714 with a time value that is relative to the time of performing a write operation, the database 722 may be updated with a new time-to-X value for the data object 708, 714. For example, a previous time value for a time-to-compress-after-a-time-to-store operation may specify a value of "A" milliseconds for the first data object 708, however, the database 722 may have a time-to-compress value of "undefined" at a certain time T0. In such examples, when a write operation is performed to first data object 708, then a new time-to-compress value equal to "A" milliseconds is recorded into the database 722 by the operation writer 734.

The operation writer 734 of the first edge node 702 may perform a set operation to associate a time value T for a particular data lifecycle management operation X (i.e., a time-to-X operation) with an object identifier tag for a data object (e.g., the first object identifier tag 712 for the first data object 708, the second object identifier tag 716 for the second data object 714). For example, if the first object identifier tag 712 is initially associated with a time value T' ("T prime") for a time-to-X operation, the operation writer 734 can perform a set operation to update the time value T' to a time value T for the time-to-X operation. The operation writer 734 can perform the set operation as a three operator sequence:

_set_prologue (Obj-ID, X, T', T)

to perform any precursor actions in advance of updating the time value, where Obj-ID is the object identifier tag for the data object (e.g., the tag 712 for the first data object 708), and X is the particular time-to-X operation;

_set (Obj-ID, X, T)

to set the time value to T for the time-to-X operation; and

_set_epilogue (Obj-ID, X, T)

to perform any closure actions, such as communicating the updated time value T to the database 722.

In examples disclosed herein, a precursor action is any action that may be performed (e.g., necessary to perform) before a particular operation is properly specified. An example precursor action includes conversion of a time value from one format to another format, such as from a relative time to an absolute time or vice versa. Another example precursor action includes a serialization operation, in which the operation writer 734 confirms that the first edge node 702 is the only node that is changing a time-to-X value at a given instant, so that the node administration rules 720 are not inconsistently updated. A third example of a precursor operation includes opening a database log so that the time-to-X set operation _set(Obj-ID, X, T) is entered into an operations log with the identifier of a process or task that is performing the _set ( . . . ) operation.

The operation writer 734 of the example operation manager 724 can perform other write operations in addition to or in alternative to the time value set operation disclosed above. In some examples, the operation writer 734 performs one or more chaining operations to link two or more time-to-X operations.

For example, a dependency may exist between a first data lifecycle management operation P (e.g., a first time-to-X operation) and a second data lifecycle management operation Q (e.g., a second time-to-X operation) for the first data object 708, where the second data lifecycle management operation Q is to occur, for instance, after the first data lifecycle management operation P in the time domain. In such examples, the operation writer 734 can write a chained operation such as "time-to-Q-after-Time-to-P." In examples disclosed herein, chained operations can apply to a data object (e.g., the first data object 708) or can apply between operations for two or more data objects (e.g., the first data object 708 and the second data object 714).

In some examples, a dependency between two time-to-X operations is common and may be previously written in the metadata associated with a data object for execution by the operation executor 725, such as operation c.4 in Table 1 above ("time-to-store-after-time-to-encrypt") or operation c.7 ("time-to-decompress-after-time-to-decrypt"). In other examples, dependencies between the time-to-X operations may be unknown or uncommon and, thus, not previously encoded in metadata for the data object(s). In such examples, the operation writer 734 provides for chaining of the dependent operations.

The chaining operation(s) can occur for two or more operations for the same data object (e.g., the first data object 708). In examples disclosed herein, the operation writer 734 uses a bridge operator, or a "no-operation" operator corresponding to operation c.19 in Table 1 above (i.e., "Time-to-No-Op") to link the two or more operations. For example, the operation writer 734 can write a chained operation in which a replication operation is to occur for the first data object 708 only after a deduplication operation is performed to prevent duplicative data from being replicated. The operation writer 734 can define the time between the execution of the two operations to be, for instance, five microseconds. In such examples, the operation writer 734 writes the chaining operation as two primitives:

TTX0-to-TTX1 (Obj-ID, Time-to-Dedup "T0", Time-to-NoOP "0"), where Obj-ID is the object identifier tag for the data object (e.g., the tag 712 for the first data object 708), T0 is the time value associated with the Time-to-Dedup operation, and Time-to-NoOP is the bridge operator; and TTX0-to-TTX1 (Obj-ID, Time-to-NoOP "5", Time-to-Replicate "T1"), where the value 5 is the time between the execution of the Time-to-Dedup operation and the Time-to-Replicate operation and T1 is the time value associated with the Time-to-Replicate operation.

More generally, the chained operations above can be represented by the following primitive:

TTX0-to-TTX1 (Obj-ID, (X0) (X1)), where X0 is the first time-to-X operation and associated time value and X1 is the second time-to-X operation and associated time value, where one of X0 or X1 is the bridge operator (e.g., Time-to-NoOP).

The chaining primitives can be programmed using graph processing language such as Neo4j™, Giraph™, or Pregel™. For example, the chaining of two dependent primitives can be programmed as a node operation in a graph processing language, where the graph includes TTX0-to-TTX1 linkage(s) between the dependent operations for the data object.

In some examples, the operation writer 734 chains operations between different data object (e.g., the first data object 708 and the second data object 714). As an example of dependencies between operations for two data objects, when a file is moved to a directory, the directory's linkage to the file should be updated. Also, the file's linkage to the file's parent directory should be updated. In addition, the file's metadata should be updated. However, theses updates should occur in a particular order, with the directory's linkage to the file being updated last so if a crash occurs before the directory's linkage is in place, the linkage can be recovered by listing an orphaned file in a lost-and-found directory during recovery. Updating the linkages in this order provides for a more efficient and systematic recovery in the event of a crash than attempts to repair bad files or corrupt subtrees in a directory based on exhaustive verification.

The operation writer 734 writes the chained operations between two data objects using the bridge operator disclosed above. For example, the operation writer 734 can chain (a) a first time-to-X operation such as Time-to-Replicate with a time value of 10 seconds for the first data object 708 (i.e., replicate after 10 seconds) and (b) a second time-to-X operation such as Time-to-Send with a time value of 20 seconds for the second data object 714 (i.e., send after 20 seconds), with a time delta of 3 seconds between the execution of the Time-to-Replicate operation for the first data object 708 and the Time-to-Send operation for the second data object 714. In this example, the operation writer 734 can write the following sequence for the chaining the operations between the two data objects:

TTX0-to-TTX1 (U, Time-to-Replicate "10", Time-to-NoOP "3"), where U represents the object identifier tag for the first data object (e.g., the tag 712 for the first data object 708) and Time-to-NoOP is the bridge operator;

TTX0-to-TTX0 (U, V, Time-to-NoOP "0"), where V represents the object identifier tag for the second data object (e.g., the tag 716 for the second data object 714); and TTX0-to-TTX1 (V, Time-to-NoOP "0", Time-to-Send "20").

In the above sequence, the second primitive TTX0-to-TTX0 permits a time dependence between the bridge operators (the no-operation operators) between the two different data objects. Put another way, the TTX0-to-TTX0 primitive links the bridge operator for the first data object (e.g., the first data object 708) to the bridge operator for the second data object (e.g., the second data object 714) in the database 722. In examples where the primitives are written using a graph processing language, the TTX0-to-TTX0 primitive creates a trigger that transfers graph execution from the graph of a first data object to that of a data second object. Put another way, the TTX0-to-TTX0 primitive creates event-linkages between two graphs, where each graph has TTX0-to-TTX1 linkages between the bridge operator and the time-to-X operation for a particular data object.

Thus, examples disclosed herein provide for automated management of set operations and dependent operation chains without centralizing the data lifecycle management operations and/or the order in which the operations are linked or chained.

The example operation manager 724 includes a communicator 736 that provides means for enabling the first edge node 702 to communicate with other edge node(s), client(s), and/or cloud center(s) in the system 700. In some examples, the communicator 736 transmits, for instance, the first data object 708 to the second edge node 704 after the operation executor 725 and/or the operation writer 734 have performed one or more data lifecycle management operations associated with the first data object 708 (e.g., read operations or write operations). In such examples, upon assuming ownership of the first data object 708, the operation manager 724 of the second edge node 704 can perform additional data lifecycle management operation(s) associated with the first data object 708, including any data lifecycle management operations set for or written to the first data object 708 by the operation writer 734 of the first edge node 702. Thus, in examples disclosed herein, the second edge node 704 receives a current copy of the first data object 708 that reflects any modifications (e.g., set operations, chain operations) that may have been performed at the first edge node 702.

Upon receipt of the first data object 708 from the first edge node 702, the operation manager 724 of the second edge node 704 can perform any data lifecycle management operations associated with the first object 708 by retrieving the time value T for a particular time-to-X operation as disclosed in connection with the time parameter retriever 726 of the first edge node 702 using the first object identifier tag 712 associated with the first data object 708. Thus, in examples disclosed herein, each edge node 702, 704, 706 determines the time value(s) T for the time-to-X operation(s) associated with the data object(s) 708, 714 when the particular node 702, 704, 706 has ownership of the data object 708, 714. Further, the declarative nature of the time-to-X operations enable the operation manager 724 of each respective node 702, 704, 706 to perform the operation(s) using varied processes to satisfy the purpose of the operation and the associated time value. Thus, examples disclosed herein provide for distributed management of lifecycle states of the data object(s) at each node.

In some examples, a copy of a data object such as the first data object 708 is owned by each of the first edge node 702 and the second edge node 704 concurrently. Put another way, the first edge node 702 and the second edge node 704 can each have ownership of the first data object 708 at the same time. In such examples, the operation manager 724 of the first edge node 702 retrieves the time value(s) T for the time-to-X operation(s) of the first data object 708 as the operation(s) are executed by the operation manager 724 of the first edge node 702. Similarly, the operation manager 724 of the second edge node 704 retrieves the time value(s) T for the time-to-X operation(s) of the first data object 708 as the operation(s) are executed by the operation manager 724 of the second edge node 704. Thus, as a result of the distributed manner for retrieving the time value(s) for the time-to-x operation(s), the first edge node 702 and the second edge node 704 do not need to interact with each other (or with other nodes in the system 700) when executing the time-to-X operation(s). Further, the distributed manner for retrieving the time parameters for time-to-x operation(s) eliminates the need for synchronization between the edge nodes 702, 704 with respect to, for instance, timing at which the operation(s) are executed at each node. Instead, responsibility for managing the lifecycles of the data object(s) is distributed to each edge node. Each edge node can proceed as needed to satisfy the time-to-X operation(s) rather than being directed from a central source as to how and/or when to implement the operations via imperative commands.

The distributed, declarative lifecycle management of data disclosed in connection with FIG. 7 can be implemented in systems that may or may not include relational databases. Rather, the examples of FIG. 7 can apply to, for instance, a relational database, a distributed key-value store, and/or a distributed file system. More generally, the time-to-X format can apply to a content management system that includes local or distributed and/or file-, object- or relation-oriented.

Support for executing time-to-X operations as disclosed above in connection with FIG. 7 can be implemented at, for example, a smart network interface card (NIC) of an edge device to enable the NIC to perform timed operation(s) and chaining on data object(s) similar to a CPU or GPU of the edge device. Data object(s) can be accessible (e.g., directly accessible) to the NIC in a host system memory or private memory for the NIC. In some examples, the time-to-X operations are defined at the NIC for data such as packet header data or packet payloads data. In such examples, the MC may perform timed-operations including compression, encryption, decompression, decryption, etc. using a packet processing acceleration mechanism included in the NIC.

For example, some NICs can perform non-volatile memory (NVM)-over-Fabric or persistent memory-over-Fabric atomic stores to remote memory. In such examples, the NIC may stream log buffer updates directly from system memory to remote non-volatile memory for active-active or active-passive backups. The use of time-to-X operations eliminates the need for the CPU to micromanage replication of journals or log updates that accumulate a large number of transactional log records and perform the logs in a batched order, so that multiple machines can store independent copies of the logs, or harvest them (e.g., log rendering) to achieve fast and efficient distributed checkpointing over distributed operations. The time-to-X operations, where the operation X is a send-after-a-store operation, specify delay values that, for example, order a third update in a log after a second update in the log and the second update in the log after a first update in the log, without the CPU receiving the acknowledgement for the first update of the log from all the log replicas before sending the second update, receiving the acknowledgement for the second update from all the log replicas before sending the third update, etc. to ensure that all replicas receive all log updates in the correct order and to issue the successive log updates. The delay values of the send-after-a-store operation can be very small, for example, in units of a few milliseconds), which is sufficient to cover variations in the time that it may take the log updates to reach different replicas. A distributed transaction management system may further specify different send-delays at different times in order to adapt to congestion.

Further, the concept of moving data to persistent/non-volatile states can extend beyond the use of NICs and/or network attached storage (NAS). Safety, safe or highly available computing can be achieved using the time-to-X operations where certain functions that move the data into a persistent state are recognized as having safety "state." When a "safe" state function is used, the imperative state of the application transitions to a next imperative state. In such instances, time-to-X operations can be used to implement safer execution and to create highly available data where each "safe" time-to-X function sets a rollback starting point and all functions that are not 'safe' can be rolled back to a "safe" function by generating a log of which string of functions exist between "safe" functions.

In other examples, support for executing time-to-X operations as disclosed above in connection with FIG. 7 can be implemented at smart block storage controllers. Support for time-to-X operations at a smart block storage controller provides for decoupling of storage tiering operations and migrates the operations into multi-tiering between a performance tier and cost (e.g., resource costs) tiers at the smart block storage controller (e.g., memory hierarchy, storage hierarch). In particular, two or more smart storage controllers may collaboratively move content between a high performance, low capacity tier associated with a first controller and a low performance, high capacity tier (e.g., cold storage) associated with a second controller. In such examples, the storage controllers may optionally have the capability to proactively replicate content into cold-storage and then clean (evict, or flush) content from hot-storage at a later time.

The time-to-X examples disclosed herein can be applied within memory hierarchy to optimize storage hierarchy resource cost/performance trade-offs. For instance, lower resource cost memory can be used when time-to-X headroom permits such memory to be used. Tiered time-to-X layering can be used to implement high availability data storage systems and caching systems by automatically moving or replicating data in high performance-high-resource-cost memory into low-performance-low-resource-cost memory asynchronously.

While an example manner of implementing the operation manager 724 is illustrated in FIG. 7, one or more of the elements, processes and/or devices illustrated in FIG. 7 may be combined, divided, re-arranged, omitted, eliminated and/or implemented in any other way. Further, the example operation executor 725, the example time parameter retriever 726, the example QoS manager 729, the example clock monitor 730, the example operation writer 734, the example communicator 736 and/or, more generally, the example operation manager 724 of FIG. 7 may be implemented by hardware, software, firmware and/or any combination of hardware, software and/or firmware. Thus, for example, any of the example operation executor 725, the example time parameter retriever 726, the example QoS manager 729, the example clock monitor 730, the example operation writer 734, the example communicator 736 and/or, more generally, the example operation manager 724 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example operation executor 725, the example time parameter retriever 726, the example QoS manager 729, the example clock monitor 730, the example operation writer 734, and/or the example communicator 736 is/are hereby expressly defined to include a non-transitory computer readable storage device or storage disk such as a memory, a digital versatile disk (DVD), a compact disk (CD), a Blu-ray disk, etc. including the software and/or firmware. Further still, the example operation manager 724 may include one or more elements, processes and/or devices in addition to, or instead of, those illustrated in FIG. 7, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 8:
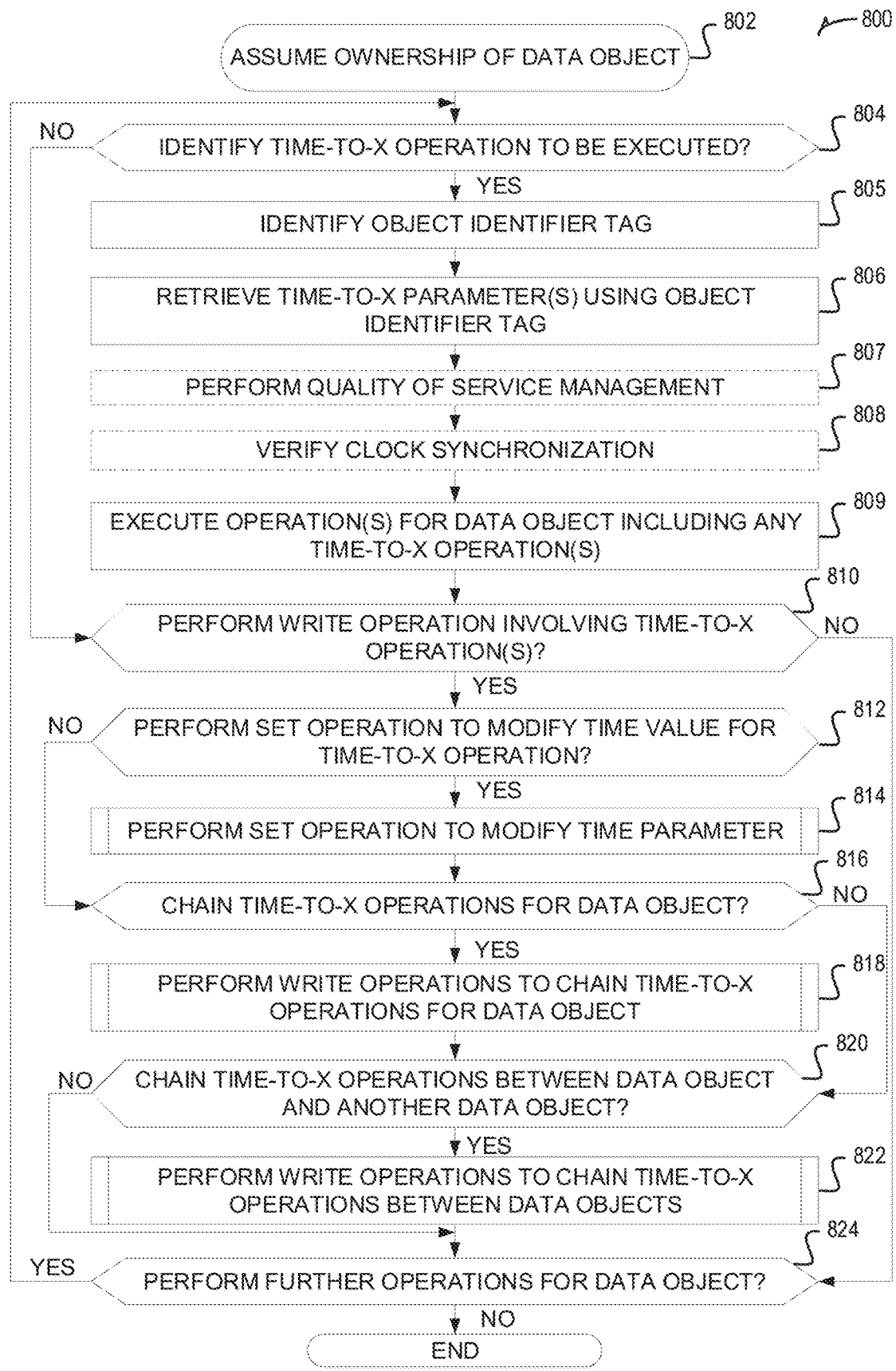
FIG. 8 is a flowchart representative of machine readable instructions that may be executed to implement the example operation manager of an edge node of FIG. 7.
Figure 9:
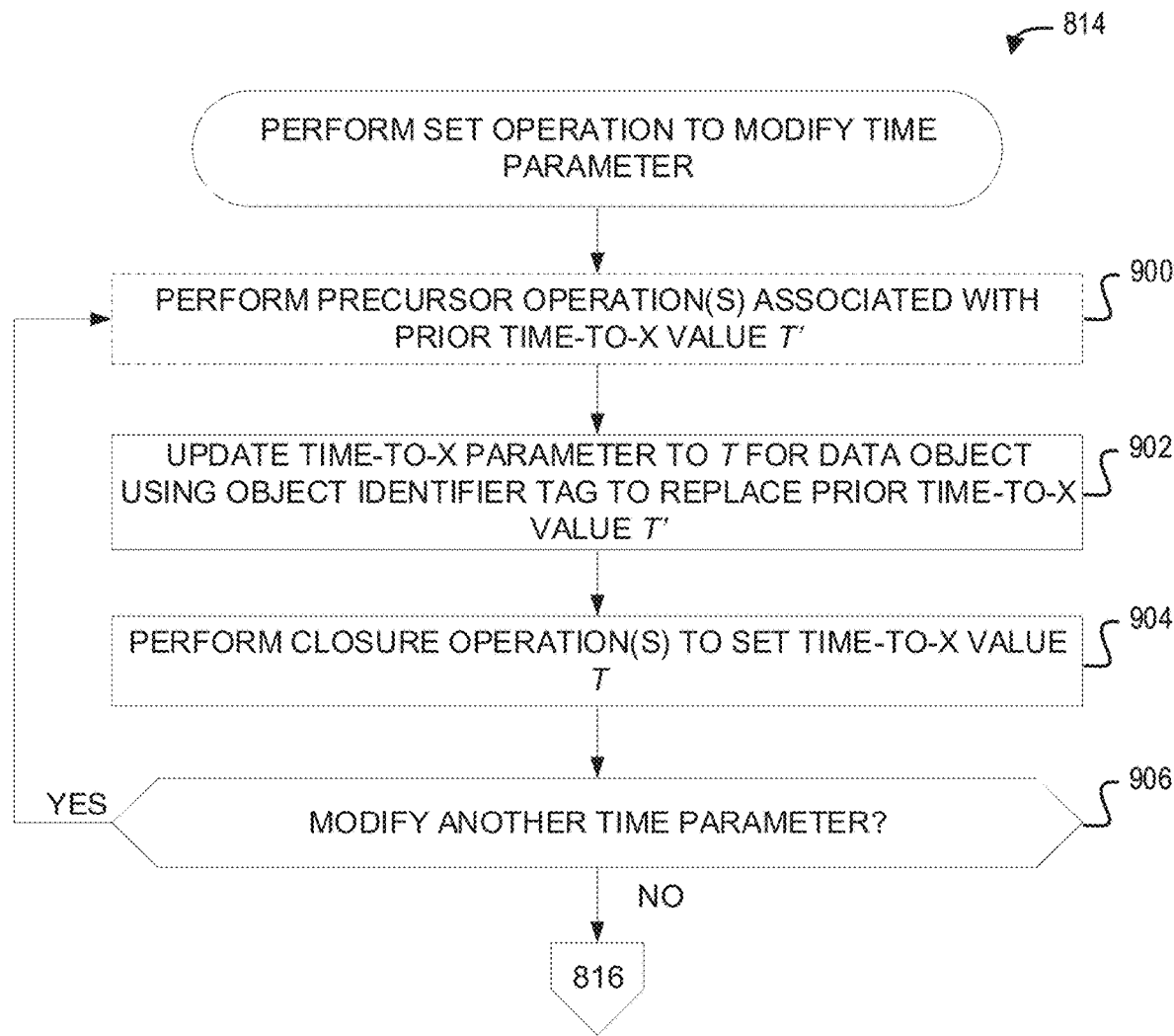
FIG. 9 is a flowchart representative of machine readable instructions that may be executed to implement block 814 of FIG. 8.
Figure 10:
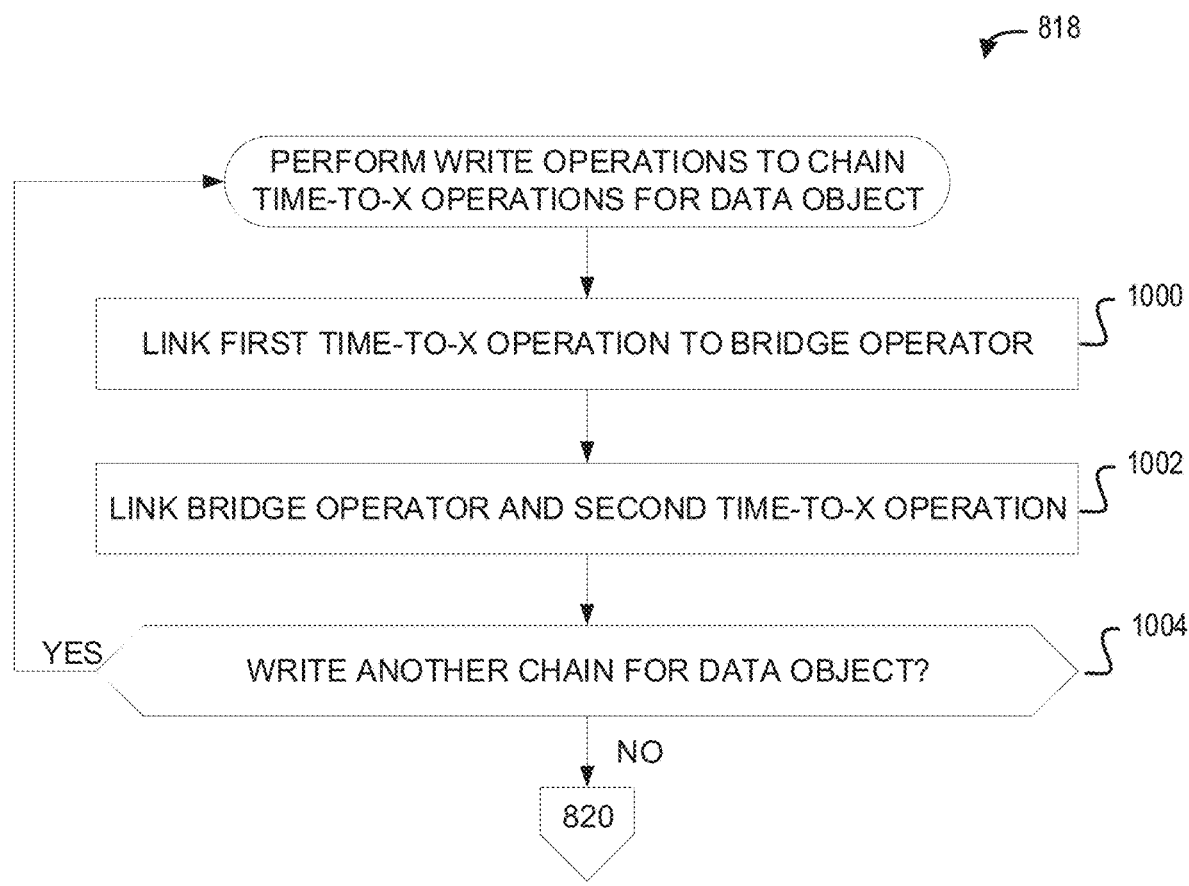
FIG. 10 is a flowchart representative of machine readable instructions that may be executed to implement block 818 of FIG. 8.

Flowcharts representative of example hardware logic, machine readable instructions, hardware implemented state machines, and/or any combination thereof for implementing the example operation manager 724 of FIG. 7 are shown in FIGS. 8, 9, 10, and/or 11. The machine readable instructions may be one or more executable programs or portion(s) of an executable program for execution by a computer processor and/or processor circuitry, such as the processor 1252 shown in the example processor platform discussed below in connection with FIG. 12B. The program may be embodied in software stored on a non-transitory computer readable storage medium such as a CD-ROM, a floppy disk, a hard drive, a DVD, a Blu-ray disk, or a memory associated with the processor 1252, but the entire program and/or parts thereof could alternatively be executed by a device other than the processor 1252 and/or embodied in firmware or dedicated hardware. Further, although the example program is described with reference to the flowcharts illustrated in FIGS. 8, 9, 10, and/or 11, many other methods of implementing the example operation manager 724 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 8, 9, 10, and/or 11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 8 is a flowchart representative of example machine readable instructions 800 that, when executed by one of the edge nodes 702, 704, 706 of the example system 700 of FIG. 7 causes the edge node 702, 704, 706 to manage data lifecycle operation(s) for one or more data object(s) 708, 714, received at the edge node. The example instructions, when executed, results in performance of one or more read operations and/or write operations by the operation manager 724 of the edge node 702, 704, 706 with respect to time-to-X operations. For illustrative purposes, the instructions 800 of FIG. 8 will be discussed in connection with the example first edge node 702 of FIG. 7. However, the instructions 800 of FIG. 8 can be implemented in connection with any of the other edge nodes 704, 706 of the example system 700 of FIG. 7.

The instructions 800 of FIG. 8 begin when the edge node 702 obtains ownership of (e.g., accesses or receives) a data object such as the first data object 708 and/or the second data object 714 (block 802). The data object can be stored in the database 710 accessible by the operation manager 724 of the first edge node 702.

In FIG. 8, if the operation executor 725 of the operation manager 724 identifies a time-to-x operation to be performed (e.g., via a read operation) (block 804), the time parameter retriever 726 of the operation manager 724 identifies the object identifier tag associated with the data object (e.g., the first object identifier tag 712 of the first data object 708, the second object identifier tag 716 of the second data object 714) (block 805). Example time-to-X operations can include, for instance, time-to-encrypt, time-to-decrypt, time-to-send, and/or other example operations identified in Table 1, above.

In the example of FIG. 8, the time parameter retriever 726 retrieves the time value T associated with the time-to-X operation from the database 722 (or another database), which stores the time value(s) 728 for time-to-X operation (s) for the data object(s) (block 806). In some examples, the time parameter retriever 726 uses the object identifier tag of the data object to retrieve the time parameter for the time-to-X operation by executing a "get" operation (e.g., TTX (Obj-ID): Obj-ID $\xrightarrow{X}$ T, where T is either a relative time from current time or an absolute time and Obj-ID is the object identifier tag).

In some examples, the QoS manager 729 manages the allocation of resources to perform the time-to-X operation in satisfy term(s) of service level agreement(s) (block 807). The QoS manager 729 can manage memory bandwidth allocation, CPU, etc. to enable the time-to-X operation to be executed in accordance with the SLA. For example, the QoS manager 729 can adjust the allocation of resources to meet the time value associated with the time-to-X operation as specific or adjust the allocation of resources in view of other services that may be assigned higher priority in accordance with the SLA.

In some examples, the clock monitor 730 verifies that the clock 732 of the first edge node 702 is synchronized with reference clock(s) (e.g., a global clock, a local clock) in accordance with a time synchronization protocol (block 808).

After the time parameter retriever 726 retrieves the time value T for the time-to-X operation, the operation executor 725 performs the time-to-X operation and/or any other operation(s) for the data object (block 809).

In some examples, the first edge node 702 is assigned permissions to perform write operations with respect to the data object 708, 714 (block 810). The permissions assigned to the first edge node 702 can be defined by the node administration rule(s) 720 stored in the database 722.

In some examples, the write operations performed by the operation writer 734 of the operation manager 724 include set operations to modify a time value assigned to a time-to-X operation (block 812). In such examples, the operation writer 734 performs a set operation to modify the time value assigned to a time-to-X operation (block 814), as disclosed, for instance, in connection with the example instructions of FIG. 10.

In some examples, the write operations performed by the operation writer 734 include chaining two or more time-to-X operations for the data object (block 816). In such examples, the operation writer 734 performs write operations to chain the time-to-X operations for the data object (block 818), as disclosed, for instance, in connection with the example instructions of FIG. 11.

In some examples, the write operations performed by the operation writer 734 include chaining two or more time-to-X operations between the data object and a second data object (block 820). In such examples, the operation writer 734 performs write operations to chain the time-to-X operations between the data objects (block 822), as disclosed, for instance, in connection with the example instructions of FIG. 12.

The example instructions 800 of FIG. 8 end when there are no further operations to be executed for the data object (block 824).

FIG. 9 is a flowchart representative of example machine readable instructions that may be executed to implement block 814 of FIG. 8 to perform a set operation to modify a time parameter of a time-to-X operation. For illustrative purposes, the instructions of FIG. 9 will be discussed in connection with the example first edge node 702 of FIG. 7. However, the instructions of FIG. 9 can be implemented in connection with any of the other edge nodes 704, 706 of the example system 700 of FIG. 7.

In some examples, the operation executor 725 of the operation manager 724 of the first edge node 702 perform precursor operation(s) prior to updating the time parameter (block 900). Example precursor operations include conversion of a time value from a first time format to a second time format (e.g., from a relative time to an absolute time), serialization operation(s) to confirm that the operation writer 734 of the first edge node 702 is the only node that is changing a time-to-X value at a given instant, etc.

The operation writer 734 updates the time value for the time-to-X operation to replace a prior time value T' ("T prime") for the time-to-X operation with a time value T for a data object (block 902). For example, the operation writer 734 can perform the following set operation to modify the time value:

_set (Obj-Id, X, T), where Obj-Id is the object identifier for the data object, X is the time-to-X operation, and T is the time value (i.e., the updated time value).

In the example of FIG. 9, the operation manager 724 performs any closure operation(s) to complete the updating of the time parameter T for the time-to-X operation for the data object (block 904). For example, the communicator 736 can send the updated time parameter T to the database 722 so that the time value(s) 728 stored at the database 722 are up-to-date.

When there are no further time values to modify for time-to-X operations for the data object (block 906), control advances to block 816 of FIG. 8.

FIG. 10 is a flowchart representative of example machine readable instructions that may be executed to implement block 818 of FIG. 8 to perform write operations to chain time-to-X operations for a data object. For illustrative purposes, the instructions of FIG. 10 will be discussed in connection with the example first edge node 702 of FIG. 7. However, the instructions of FIG. 10 can be implemented in connection with any of the other nodes 704, 706 of the example system 700 of FIG. 7.

In the example of FIG. 10, the operation writer 734 of the operation manager 724 of the first edge node 702 chains or links a first time-to-X operation to a bridge operator for the data object (e.g., the first data object 708) (block 1000). For example, the operator writer 734 writes the following chaining primitive to link the first time-to-X operation to a bridge operator (e.g., a no-operation operator):

TTX0-to-TTX1(Obj-ID, X0, Time-to-NoOP "0"), where Obj-ID is the object identifier tag for the data object and X0 is the first time-to-X operation and associated time value (e.g., "T0").

In the example of FIG. 10, the operator writer 734 chains or links the bridge operator and a second time-to-X operation, thereby linking the first time-to-X operation and the second time-to-X operation (block 1002). For example, the operator writer 734 writes the following chaining primitive to link the bridge operator and the second time-to-X operation:

TTX0-to-TTX1(Obj-ID, Time-to-NoOP "T1", X1), where T1 is the time value (e.g., time delta) for chaining the first time-to-X operation and the second time-to-X operation, and X1 is the second time-to-X operation and associated time value (e.g., "T2").

In the example of FIG. 10, the primitives at blocks 1000 and/or 1002 may be written by the operation writer 734 using, for instance, a graph processing language.

When there are no further time-to-X operations to be chained for the data object (block 1004), control advances to block 820 of FIG. 8.

Figure 11:
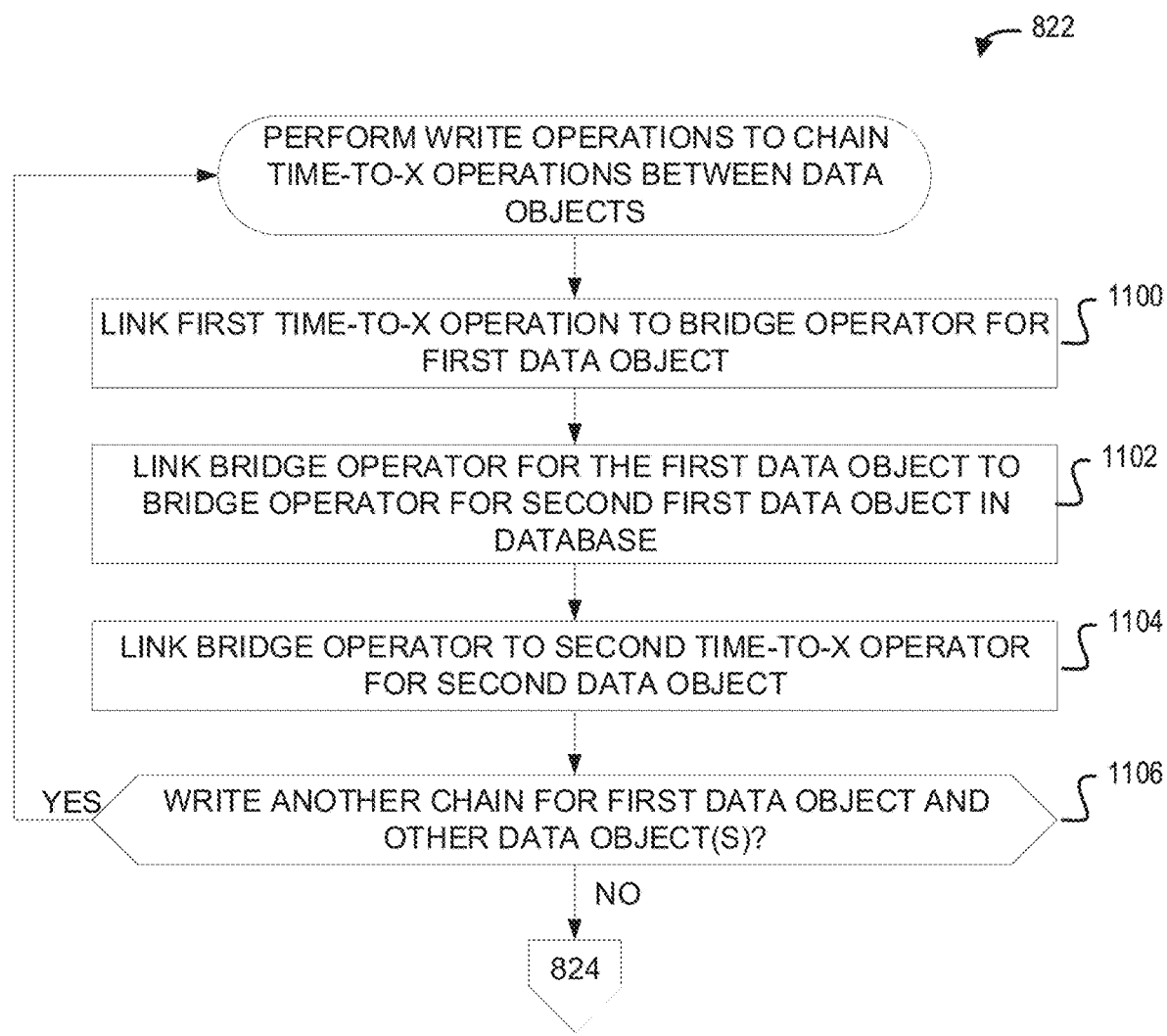
FIG. 11 is a flowchart representative of machine readable instructions that may be executed to implement block 822 of FIG. 8.

FIG. 11 is a flowchart representative of example machine readable instructions that may be executed to implement block 822 of FIG. 8 to perform write operations to chain time-to-X operations between two data objects. For illustrative purposes, the instructions of FIG. 11 will be discussed in connection with the example first edge node 702 of FIG. 7. However, the instructions of FIG. 11 can be implemented in connection with any of the other nodes 704, 706 of the example system 700 of FIG. 7.

In the example of FIG. 11, the operator writer 734 chains or links a first time-to-X operation to a bridge operator for a first data object (e.g., the first data object 708) (block 1100). For example, the operator writer 734 writes the following chaining primitive to link the first time-to-X operation to the bridge operator (e.g., a no-operation operator) for the first data object:

TTX0-to-TTX1(First Obj-ID, X0, Time-to-NoOP "T1"), where First Obj-ID is the object identifier tag for the first data object, X0 is the first time-to-X operation and associated time value (e.g., "T0"), and T1 is the time value associated with the bridge operator (i.e., a time between the first time-to-X operation and a second time-to-X operation).

In the example of FIG. 11, the operator writer 734 chains or links the bridge operator for the first data object to a bridge operator for a second data object (e.g., the second data object 714) (block 1102) in the database 722. For example, the operator writer 734 writes the following chaining primitive to link the bridge operator for the first data object to the bridge operator for the second data object:

TTX0-to-TTX1 (First Obj-Id, Second Obj-Id, Time-to-NoOp "0"), where First Obj-Id is the object identifier tag for the first data object and Second Obj-Id is the object identifier tag for the second data object.

In the example of FIG. 11, the operator writer 734 chains or links the bridge operator to the second time-to-X operation for the second data object (block 1104). For example, the operator writer 734 writes the following chaining primitive to link the bridge operator to the second time-to-X operation for the second data object:

TTX0-to-TTX1 (Second Obj-ID, Time-to-NoOP "0", X1), where X0 is the first time-to-X operation and associated time value (e.g., "T2").

When there are no further time-to-X operations to be chained for the first data object and other data object(s) (block 1106), control advances to block 824 of FIG. 8.

Figure 12A:
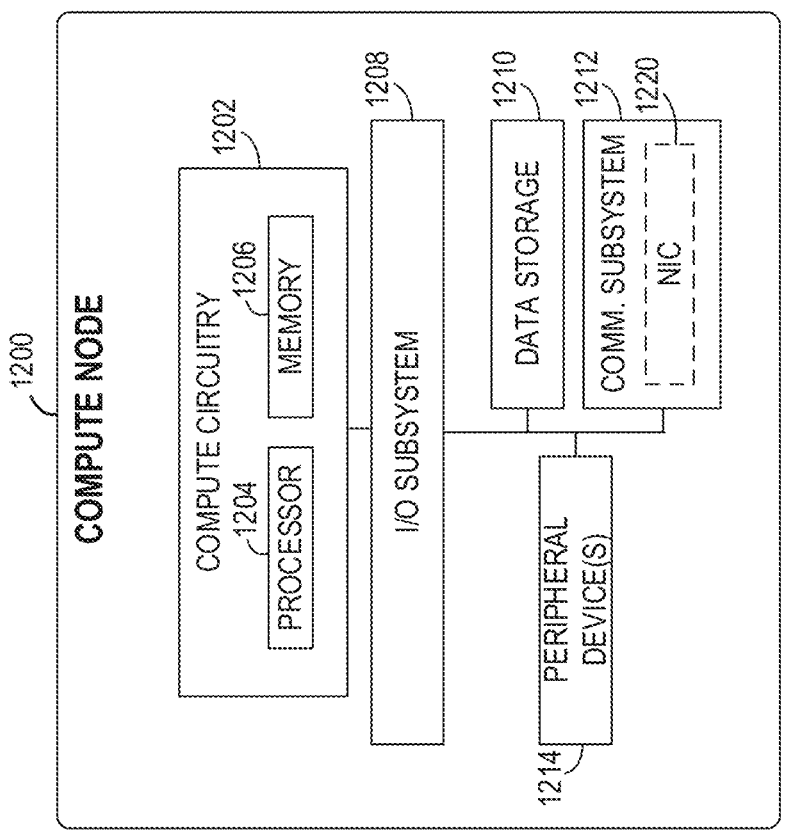
FIG. 12A is a block diagram of an example implementation of an example compute node that may be deployed in one of the edge computing systems illustrated in FIGS. 1-4, 6, and/or 7.

FIG. 12A is a block diagram of an example implementation of an example edge compute node 1200 that includes a compute engine (also referred to herein as "compute circuitry") 1202, an input/output (I/O) subsystem 1208, data storage 1210, a communication circuitry subsystem 1212, and, optionally, one or more peripheral devices 1214. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component. The example edge compute node 1200 of FIG. 12 may be deployed in one of the edge computing systems illustrated in FIGS. 1-4, 6, and/or 7 to implement any edge compute node of FIGS. 1-4, 6, and/or 7 (e.g., the edge node(s) 702, 704, 706).

The compute node 1200 may be embodied as any type of engine, device, or collection of devices capable of performing various compute functions. In some examples, the compute node 1200 may be embodied as a single device such as an integrated circuit, an embedded system, a field-programmable gate array (FPGA), a system-on-a-chip (SOC), or other integrated system or device. In the illustrative example, the compute node 1200 includes or is embodied as a processor 1204 and a memory 1206. The processor 1204 may be embodied as any type of processor capable of performing the functions described herein (e.g., executing an application). For example, the processor 1204 may be embodied as a multi-core processor(s), a microcontroller, a processing unit, a specialized or special purpose processing unit, or other processor or processing/controlling circuit.

In some examples, the processor 1204 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 1204 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 1204 may work in coordination with each other to execute many types of operations and instructions within and on behalf of the compute node 1200.

The memory 1206 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 1206 may be integrated into the processor 1204. The memory 1206 may store various software and data used during operation such as one or more applications, data operated on by the application(s), libraries, and drivers.

The compute circuitry 1202 is communicatively coupled to other components of the compute node 1200 via the I/O subsystem 1208, which may be embodied as circuitry and/or components to facilitate input/output operations with the compute circuitry 1202 (e.g., with the processor 1204 and/or the main memory 1206) and other components of the compute circuitry 1202. For example, the I/O subsystem 1208 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1208 may form a portion of a system-on-a-chip (SoC) and be incorporated, along with one or more of the processor 1204, the memory 1206, and other components of the compute circuitry 1202, into the compute circuitry 1202.

The one or more illustrative data storage devices 1210 may be embodied as any type of devices configured for short-term or long-term storage of data such as, for example, memory devices and circuits, memory cards, hard disk drives, solid-state drives, or other data storage devices. Individual data storage devices 1210 may include a system partition that stores data and firmware code for the data storage device 1210. Individual data storage devices 1210 may also include one or more operating system partitions that store data files and executables for operating systems depending on, for example, the type of compute node 1200.

The communication circuitry 1212 may be embodied as any communication circuit, device, or collection thereof, capable of enabling communications over a network between the compute circuitry 1202 and another compute device (e.g., an edge gateway of an implementing edge computing system). The communication circuitry 1212 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1212 includes a network interface controller (NIC) 1220, which may also be referred to as a host fabric interface (HFI). The NIC 1220 may be embodied as one or more add-in-boards, daughter cards, network interface cards, controller chips, chipsets, or other devices that may be used by the compute node 1200 to connect with another compute device (e.g., an edge gateway node). In some examples, the NIC 1220 may be embodied as part of a system-on-a-chip (SoC) that includes one or more processors, or included on a multichip package that also contains one or more processors. In some examples, the NIC 1220 may include a local processor (not shown) and/or a local memory (not shown) that are both local to the NIC 1220. In such examples, the local processor of the NIC 1220 may be capable of performing one or more of the functions of the compute circuitry 1202 described herein. Additionally, or alternatively, in such examples, the local memory of the NIC 1220 may be integrated into one or more components of the client compute node at the board level, socket level, chip level, and/or other levels.

Additionally, in some examples, a respective compute node 1200 may include one or more peripheral devices 1214. Such peripheral devices 1214 may include any type of peripheral device found in a compute device or server such as audio input devices, a display, other input/output devices, interface devices, and/or other peripheral devices, depending on the particular type of the compute node 1200. In further examples, the compute node 1200 may be embodied by a respective edge compute node (whether a client, gateway, or aggregation node) in an edge computing system or like forms of appliances, computers, subsystems, circuitry, or other components.

Figure 12B:
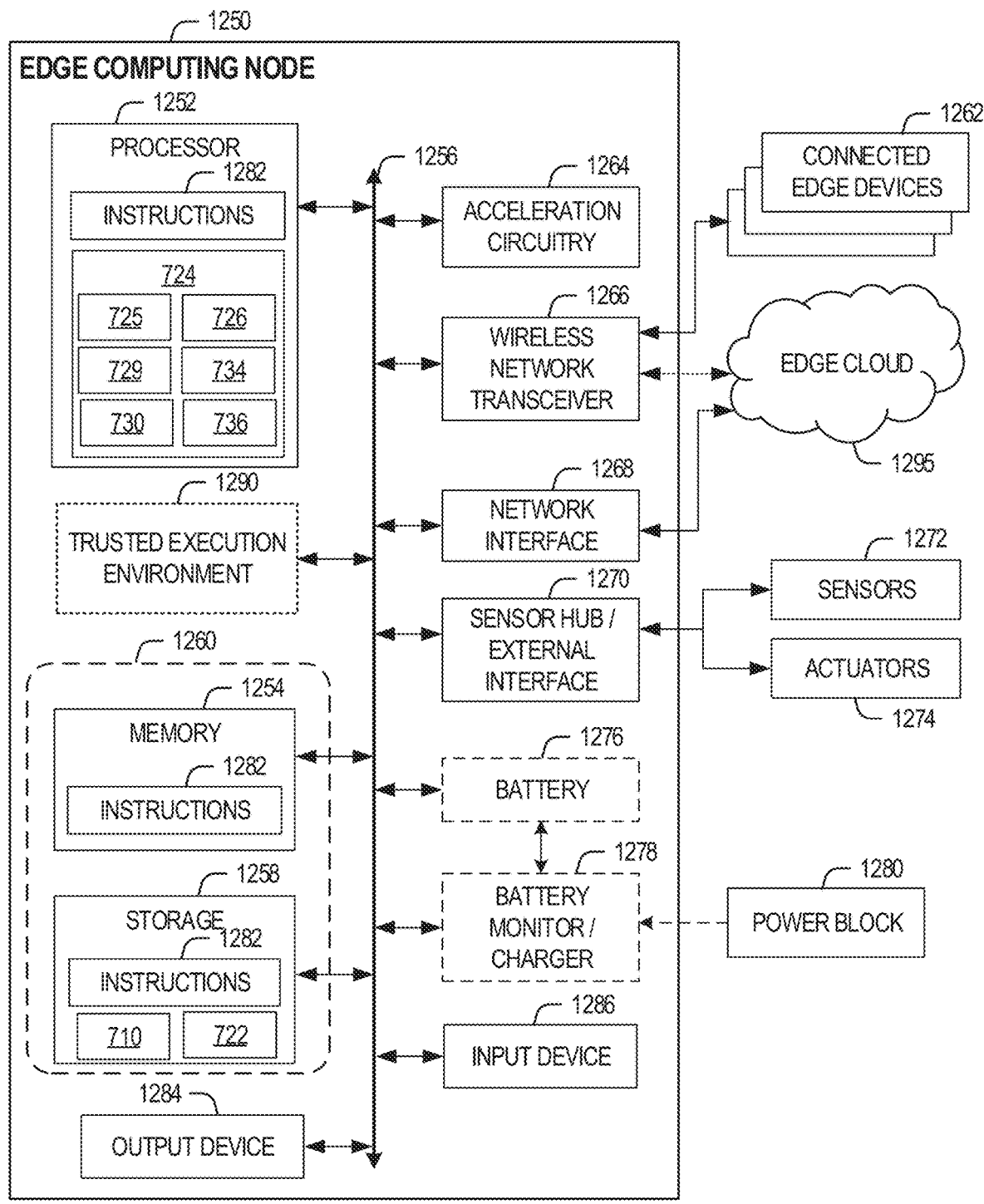
FIG. 12B is another block diagram of an example implementation of an example compute node that may be deployed in one of the edge computing systems illustrated in FIGS. 1-4, 6, and/or 7.

In a more detailed example, FIG. 12B illustrates a block diagram of an example may edge computing node 1250 structured to execute the instructions of FIGS. 8, 9, 10, and/or 11 to implement the techniques (e.g., operations, processes, methods, and methodologies) described herein such as the operation manager 724 of FIG. 7. This edge computing node 1250 provides a closer view of the respective components of node 1200 when implemented as or as part of a computing device (e.g., as a mobile device, a base station, server, gateway, etc.). The edge computing node 1250 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 1250, or as components otherwise incorporated within a chassis of a larger system. For example, the edge computing node 1250 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, an Internet of Things (IoT) device, or any other type of computing device.

The edge computing device 1250 may include processing circuitry in the form of a processor 1252, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1252 may be a part of a system on a chip (SoC) in which the processor 1252 and other components are formed into a single integrated circuit, or a single package, such as the Edison™ or Galileo™ SoC boards from Intel Corporation, Santa Clara, California. As an example, the processor 1252 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 1252 and accompanying circuitry may be provided in a single socket form factor, multiple socket form factor, or a variety of other formats, including in limited hardware configurations or configurations that include fewer than all elements shown in FIG. 12B. In this example, the processor implements the example operation executor 725, the example time parameter retriever 726, the example QoS manager 729, the example clock monitor 730, the example operation writer 734, and the example communicator 736.

The processor 1252 may communicate with a system memory 1254 over an interconnect 1256 (e.g., a bus). Any number of memory devices may be used to provide for a given amount of system memory. As examples, the memory 1254 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1258 may also couple to the processor 1252 via the interconnect 1256. In an example, the storage 1258 may be implemented via a solid-state disk drive (SSDD). Other devices that may be used for the storage 1258 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1258 may be on-die memory or registers associated with the processor 1252. However, in some examples, the storage 1258 may be implemented using a micro hard disk drive (HDD). Further, any number of new technologies may be used for the storage 1258 in addition to, or instead of, the technologies described, such resistance change memories, phase change memories, holographic memories, or chemical memories, among others.

The components may communicate over the interconnect 1256. The interconnect 1256 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1256 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 1256 may couple the processor 1252 to a transceiver 1266, for communications with the connected edge devices 1262. The transceiver 1266 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1262. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1266 (or multiple transceivers) may communicate using multiple standards or radios for communications at a different range. For example, the edge computing node 1250 may communicate with close devices, e.g., within about 10 meters, using a local transceiver based on Bluetooth Low Energy (BLE), or another low power radio, to save power. More distant connected edge devices 1262, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1266 (e.g., a radio transceiver) may be included to communicate with devices or services in the edge cloud 1295 via local or wide area network protocols. The wireless network transceiver 1266 may be a low-power wide-area (LPWA) transceiver that follows the IEEE 802.15.4, or IEEE 802.15.4g standards, among others. The edge computing node 1250 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1266, as described herein. For example, the transceiver 1266 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1266 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1268 may be included to provide a wired communication to nodes of the edge cloud 1295 or to other devices, such as the connected edge devices 1262 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1268 may be included to enable connecting to a second network, for example, a first NIC 1268 providing communications to the cloud over Ethernet, and a second NIC 1268 providing communications to other devices over another type of network.

Given the variety of types of applicable communications from the device to another component or network, applicable communications circuitry used by the device may include or be embodied by any one or more of components 1264, 1266, 1268, or 1270. Accordingly, in various examples, applicable means for communicating (e.g., receiving, transmitting, etc.) may be embodied by such communications circuitry.

The edge computing node 1250 may include or be coupled to acceleration circuitry 1264, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 1256 may couple the processor 1252 to a sensor hub or external interface 1270 that is used to connect additional devices or subsystems. The devices may include sensors 1272, such as accelerometers, level sensors, flow sensors, optical light sensors, camera sensors, temperature sensors, global navigation system (e.g., GPS) sensors, pressure sensors, barometric pressure sensors, and the like. The hub or interface 1270 further may be used to connect the edge computing node 1250 to actuators 1274, such as power switches, valve actuators, an audible sound generator, a visual warning device, and the like.

In some optional examples, various input/output (I/O) devices may be present within or connected to, the edge computing node 1250. For example, a display or other output device 1284 may be included to show information, such as sensor readings or actuator position. An input device 1286, such as a touch screen or keypad may be included to accept input. An output device 1284 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 1250. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1276 may power the edge computing node 1250, although, in examples in which the edge computing node 1250 is mounted in a fixed location, it may have a power supply coupled to an electrical grid, or the battery may be used as a backup or for temporary capabilities. The battery 1276 may be a lithium ion battery, or a metal-air battery, such as a zinc-air battery, an aluminum-air battery, a lithium-air battery, and the like.

A battery monitor/charger 1278 may be included in the edge computing node 1250 to track the state of charge (SoCh) of the battery 1276, if included. The battery monitor/charger 1278 may be used to monitor other parameters of the battery 1276 to provide failure predictions, such as the state of health (SoH) and the state of function (SoF) of the battery 1276. The battery monitor/charger 1278 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1278 may communicate the information on the battery 1276 to the processor 1252 over the interconnect 1256. The battery monitor/charger 1278 may also include an analog-to-digital (ADC) converter that enables the processor 1252 to directly monitor the voltage of the battery 1276 or the current flow from the battery 1276. The battery parameters may be used to determine actions that the edge computing node 1250 may perform, such as transmission frequency, mesh network operation, sensing frequency, and the like.

A power block 1280, or other power supply coupled to a grid, may be coupled with the battery monitor/charger 1278 to charge the battery 1276. In some examples, the power block 1280 may be replaced with a wireless power receiver to obtain the power wirelessly, for example, through a loop antenna in the edge computing node 1250. A wireless battery charging circuit, such as an LTC4020 chip from Linear Technologies of Milpitas, California, among others, may be included in the battery monitor/charger 1278. The specific charging circuits may be selected based on the size of the battery 1276, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1258 may include instructions 1282 in the form of software, firmware, or hardware commands to implement the techniques described herein. Although such instructions 1282 are shown as code blocks included in the memory 1254 and the storage 1258, it may be understood that any of the code blocks may be replaced with hardwired circuits, for example, built into an application specific integrated circuit (ASIC).

In an example, the instructions 1282 provided via the memory 1254, the storage 1258, or the processor 1252 may be embodied as a non-transitory, machine-readable medium 1260 including code to direct the processor 1252 to perform electronic operations in the edge computing node 1250. The processor 1252 may access the non-transitory, machine-readable medium 1260 over the interconnect 1256. For instance, the non-transitory, machine-readable medium 1260 may be embodied by devices described for the storage 1258 or may include specific storage units such as optical disks, flash drives, or any number of other hardware devices. The non-transitory, machine-readable medium 1260 may include instructions to direct the processor 1252 to perform a specific sequence or flow of actions, for example, as described with respect to the flowchart(s) and block diagram (s) of operations and functionality depicted above. As used herein, the terms "machine-readable medium" and "computer-readable medium" are interchangeable.

Also in a specific example, the instructions 1282 on the processor 1252 (separately, or in combination with the instructions 1282 of the machine readable medium 1260) may configure execution or operation of a trusted execution environment (TEE) 1290. In an example, the TEE 1290 operates as a protected area accessible to the processor 1252 for secure execution of instructions and secure access to data. Various implementations of the TEE 1290, and an accompanying secure area in the processor 1252 or the memory 1254 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 1250 through the TEE 1290 and the processor 1252.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

The machine executable instructions 800, 814, 818, 822 of FIGS. 8, 9, 10, and/or 11 may be stored in the mass storage device 1228, in the volatile memory 1214, in the non-volatile memory 1216, and/or on a removable non-transitory computer readable storage medium such as a CD or DVD.

From the foregoing, it will be appreciated that example methods, apparatus, systems, and articles of manufacture have been disclosed that that provide for distributed, declarative management of data lifecycle operations in an edge environment. In examples disclosed herein, time-based logic operation(s) (e.g., time-to-X operation(s) such as time-to-encrypt, time-to-compress, etc.) for data objects are programmed as declarative statements that provide an edge node with flexibility in performing the operation as compared to imperative commands. For example, an edge node performs a lookup operation to retrieve time value(s) associated with the time-based logic operation(s). In some examples, the edge node can perform write operations for the data object to modify time value(s) associated with the data lifecycle management operation(s) and/or to chain or link operations. As a result of the distributed, declarative nature of example lifecycle operations disclosed herein, each edge node in the system that obtains ownership of a data object can manage the operations for the data object without interacting with other nodes and without interfering consistency protocols. Disclosed methods, apparatus, systems, and articles of manufacture improve the efficiency and introduce flexibility with respect to data lifecycle management for data objects across tasks and/or across machines in an edge environment as compared to an imperative command approach. Disclosed methods, apparatus, systems, and articles of manufacture are accordingly directed to one or more improvement(s) in the functioning of a computer.

Example 1 includes an apparatus including an operation executor to identify a first operation to be performed for a data object at an edge node in an edge environment and a second operation to be performed for the data object, the first operation different that the second operation; and a time parameter retriever to retrieve a first time value associated with the first operation from a data source and a second time value associated with the second operation from the data source, the operation executor to execute the first operation in response to the first time value and to execute the second operation in response to the second time value.

Example 2 includes the apparatus as defined in example 1, wherein the data object includes an object identifier tag, the time parameter retriever to use the object identifier tag to retrieve the first time value and the second time value, respectively.

Example 3 includes the apparatus as defined in example 2, wherein the data object is a first data object and the operation executor is to identify a third operation to be performed for a second data object at the edge node, the time parameter retriever to retrieve a third time value associated with the third operation using a second object identifier tag for the second data object.

Example 4 includes the apparatus as defined in any of examples 1-3, further including an operation writer to modify one of the first time value or the second time value.

Example 5 includes the apparatus as defined in example 1, further including an operation writer to link the first operation to the second operation for the data object to generate a chained operation for the data object.

Example 6 includes the apparatus as defined in example 5, wherein the edge node is a first edge node and further including a communicator to transmit the data object including the chained operation to a second edge node in the edge environment.

Example 7 includes the apparatus as defined in examples 5 or 6, wherein the data object is a first data object and the operation writer is to link a third operation associated with the first data object to a fourth operation associated with a second data object, the second data object different than the first data object.

Example 8 includes the apparatus as defined in any of examples 1-7, further including a clock monitor to synchronize a clock of the edge node with reference clock data.

Example 9 includes the apparatus of as defined in in any of examples 1-8, wherein the edge node includes a virtual machine, a process, or a container.

Example 10 includes the apparatus as defined in any of examples 1-9, further including a quality of service manager, the quality of service manager to allocate one or more network resources to enable the operation executor to execute the first operation in accordance with a service level agreement.

Example 11 includes a system including a first edge node, the first edge node to receive a first data object; a second edge node, the second edge node to receive a second data object; and a data source. The first edge node is to retrieve a first time value for a first operation to be performed for the first data object from the data source based on an object identifier for the first data object and the second edge node is to retrieve a second time value for a second operation to be performed for the second data object from the data source based on an object identifier for the second data object.

Example 12 includes the system as defined in example 11, wherein the first edge node is to modify the first time value for the first operation and communicate the modified first time value to the data source.

Example 13 includes the system as defined in examples 11 or 12, wherein the first edge node is to link the first operation to a third operation for the first data object to generate a chained operation and transmit the first data object including the chained operation to the second edge node.

Example 14 includes the system as defined in example 13, wherein the chained operation is to define a time between performance of the first operation and performance of the third operation.

Example 15 includes the system as defined in example 13, wherein the second edge node is to retrieve a third time value for the third operation using the object identifier for the first data object.

Example 16 includes the system as defined in example 11, wherein the first edge node includes a first clock and the second edge node includes a second clock, each of the first clock and the second clock synchronized relative a reference clock.

Example 17 includes the system as defined in any of examples 11-16, wherein the first edge node includes a first virtual machine, a first process, or a first container and the second edge node includes a second virtual machine, a second process, or a second container.

Example 18 includes at least one non-transitory computer readable storage medium comprising instructions that, when executed, cause at least one processor to at least identify a first operation to be performed for a data object at an edge node in an edge environment; identify a second operation to be performed for the data object, the first operation different that the second operation; retrieve a first time value associated with the first operation from a data source; retrieve a second time value associated with the second operation from the data source; execute the first operation in response to the first time value; and execute the second operation in response to the second time value.

Example 19 includes the at least one non-transitory computer readable storage medium as defined in example 18, wherein the data object includes an object identifier tag and the instructions, when executed, cause the at least one processor to use the object identifier tag to retrieve the first time value and the second time value, respectively.

Example 20 includes the at least one non-transitory computer readable storage medium as defined in examples 18 or 19, wherein the data object is a first data object and the instructions, when executed, cause the at least one processor to identify a third operation to be performed for a second data object at the edge node and retrieve a third time value associated with the third operation using a second object identifier tag for the second data object.

Example 21 includes the at least one non-transitory computer readable storage medium as defined in any of examples 18-20, wherein the instructions, when executed, cause the at least one processor to modify one of the first time value or the second time value.

Example 22 includes the at least one non-transitory computer readable storage medium as defined in example 18, wherein the instructions, when executed, cause the at least one processor to link the first operation to the second operation for the data object to generate a chained operation for the data object.

Example 23 includes the at least one non-transitory computer readable storage medium as defined in example 22, wherein the edge node is a first edge node and wherein the instructions, when executed, cause the at least one processor to transmit the data object including the chained operation to a second edge node in the edge environment.

Example 24 includes the at least one non-transitory computer readable storage medium as defined in examples 22 or 23, wherein the data object is a first data object and wherein the instructions, when executed, cause the at least one processor to link a third operation associated with the first data object to a fourth operation associated with a second data object, the second data object different than the first data object.

Example 25 includes the at least one non-transitory computer readable storage medium as defined in any of examples 18-24, wherein the instructions, when executed, cause the at least one processor to synchronize a clock of the edge node with reference clock data.

Example 26 includes the at least one non-transitory computer readable storage medium as defined in any of examples 18-25, wherein the instructions, when executed, cause the at least one processor to allocate a network resource to execute the first operation in accordance with a service level agreement.

Example 27 includes an apparatus including means for retrieving a time value associated with an operation to be performed for a data object at an edge node in an edge environment, the means for retrieving to retrieve the time value from a data source based on an object identifier for the data object and means for executing the operation in response to the time value.

Example 28 includes the apparatus as defined in example 27, further including means for modifying the data object, the means for modifying to modify the time value for the operation.

Example 29 includes the apparatus as defined in example 28, wherein the means for modifying is to write an operation for the data object, the operation associated with a second time value.

Example 30 includes the apparatus as defined in examples 28 or 29, wherein the operation is a first operation and the means for modifying is to link the first operation to a second operation for the data object.

Example 31 includes the apparatus as defined in any of examples 27-30, further including means for synchronizing a clock of the edge node with a reference clock.

Example 32 includes a method including identifying a first operation to be performed for a data object at an edge node in an edge environment; identifying a second operation to be performed for the data object, the first operation different that the second operation; retrieving, by executing an instruction with a processor, a first time value associated with the first operation from a data source; retrieving, by executing an instruction with the processor, a second time value associated with the second operation from the data source; performing, by executing an instruction with the processor, the first operation in response to the first time value; and performing, by executing an instruction with the processor, the second operation in response to the second time value.

Example 33 includes the method as defined in example 32, wherein the data object includes an object identifier tag and wherein the retrieving includes using the object identifier tag to retrieve the first time value and the second time value, respectively.

Example 34 includes the method as defined in example 33, wherein the data object is a first data object and further including identifying a third operation to be performed for a second data object at the edge node and retrieving a third time value associated with the third operation using a second object identifier tag for the second data object.

Example 35 includes the method as defined in any of examples 32-34, further including modifying one of the first time value or the second time value.

Example 36 includes the method as defined in example 32, further including linking the first operation to the second operation for the data object to generate a chained operation for the data object.

Example 37 includes the method as defined in example 36, wherein the edge node is a first edge node and further including transmitting the data object including the chained operation to a second edge node in the edge environment.

Example 38 includes the method as defined in examples 36 or 37, wherein the data object is a first data object and further including linking a third operation associated with the first data object to a fourth operation associated with a second data object, the second data object different than the first data object.

Example 39 includes the method as defined in any of examples 32-38, further including synchronizing a clock of the edge node with reference clock data.

Example 40 includes the method as defined in any of examples 32-39, further including allocating a network resource to execute the first operation in accordance with a service level agreement.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   interface circuitry;
   machine-readable instructions; and
   one or more processor circuits to be programmed by the machine-readable instructions to:
      using a metadata tag associated with a data object, retrieve a first time value associated with a first operation and a second time value associated with a second operation, the first operation and the second operation to be performed using the data object;
      perform the first operation based on the first time value, the first time value indicative of a first duration of time upon which performance of the first operation depends; and
      perform the second operation based on the second time value, the second time value indicative of a second duration of time upon which performance of the second operation depends.

2. The apparatus as defined in claim 1, wherein the metadata tag is a first metadata tag, the data object is a first data object, and at least one of the one or more processor circuits is to retrieve, using a second metadata tag associated with a second data object, a third time value associated with a third duration of time until performance of a third operation.

3. The apparatus as defined in claim 1, wherein at least one of the one or more processor circuits is to modify one of the first time value or the second time value.

4. The apparatus as defined in claim 1, wherein at least one of the one or more processor circuits is to link the first operation to the second operation for the data object to generate a chained operation for the data object.

5. The apparatus as defined in claim 4, wherein the interface circuitry is to transmit the data object including the chained operation to an edge node in an edge environment.

6. The apparatus as defined in claim 4, wherein the data object is a first data object and at least one of the one or more processor circuits is to link a third operation associated with the first data object to a fourth operation associated with a second data object, the second data object different than the first data object.

7. The apparatus as defined in claim 1, wherein at least one of the one or more processor circuits is to synchronize a clock of at least one of the one or more processor circuits with reference clock data.

8. The apparatus as defined in claim 1, wherein at least one of the one or more processor circuits is to allocate one or more network resources to enable performance of the first operation in accordance with a service level agreement.

9. A system comprising:
a data source;
a first edge node to:
  access a first data object;
  use a first metadata tag associated with the first data object to retrieve a first time value from the data source, the first time value associated with a first operation; and
  perform the first operation based on the first time value, the first time value indicative of a first duration of time that defines when performance of the first operation is to occur, the first operation to be performed using the first data object; and
a second edge node to:
  access a second data object;
  use a second metadata tag associated with the second data object to retrieve a second time value from the data source, the second time value associated with a second operation; and
  perform the second operation based on the second time value, the second time value indicative of a second duration of time that defines when performance of the second operation is to occur, the second operation to be performed using the second data object.

10. The system as defined in claim 9, wherein the first edge node is to:
modify the first time value for the first operation to generate a modified first time value; and
communicate the modified first time value to the data source.

11. The system as defined in claim 9, wherein the first edge node is to:
link the first operation to a third operation for the first data object to generate a chained operation; and
transmit the first data object including the chained operation to the second edge node.

12. The system as defined in claim 11, wherein the chained operation is to define a time between performance of the first operation and performance of the third operation.

13. The system as defined in claim 11, wherein the second edge node is to retrieve a third time value for the third operation using the first metadata tag for the first data object.

14. The system as defined in claim 9, wherein the first edge node includes a first virtual machine, a first process, or a first container and the second edge node includes a second virtual machine, a second process, or a second container.

15. At least one non-transitory computer readable storage medium comprising instructions to cause at least one processor to at least:
use a metadata tag associated with a data object to retrieve a first time value associated with a first operation and a second time value associated with a second operation, the first operation and the second operation to be performed using the data object;
perform the first operation based on the first time value, the first time value indicative of a first duration of time upon which performance of the first operation depends, the first operation including at least one of a time-to-deduplicate operation, a time-to-compress-and-live operation, a time-to-store-after-time-to-encrypt operation, a time-to-encrypt-after-time-to-compress operation, a time-to-decompress-after-time-to-decrypt operation, a time-to-discard operation, a time-to-replicate operation, a time-to-send operation, a time-to-send-after-time-to-encrypt operation, a time-to-archive operation, a time-to-mark-read-only operation, a time-to-release operation, a time-to-revalidate operation, a time-to-evict-to-next-tier operation, a time-to-copy-to-shared-memory operation, or a time-to-serialize operation; and
perform the second operation based on the second time value, the second time value indicative of a second duration of time upon which performance of the second operation depends.

16. The at least one non-transitory computer readable storage medium as defined in claim 15, wherein the metadata tag is a first metadata tag, the data object is a first data object, and the instructions are to cause one or more of the at least one processor to retrieve, using a second metadata tag associated with a second data object, a third time value associated with a third duration of time until performance of a third operation.

17. The at least one non-transitory computer readable storage medium as defined in claim 15, wherein the instructions are to cause one or more of the at least one processor to modify one of the first time value or the second time value.

18. The at least one non-transitory computer readable storage medium as defined in claim 15, wherein the instructions are to cause one or more of the at least one processor to link the first operation to the second operation for the data object to generate a chained operation for the data object.

19. The at least one non-transitory computer readable storage medium as defined in claim 18, wherein the instructions are to cause one or more of the at least one processor to cause transmission of the data object including the chained operation to an edge node in an edge environment.

20. The at least one non-transitory computer readable storage medium as defined in claim 18, wherein the data object is a first data object and the instructions are to cause one or more of the at least one processor to link a third operation associated with the first data object to a fourth operation associated with a second data object, the second data object different than the first data object.

* * * * *